United States Patent [19]

Jeong et al.

[11] Patent Number: 5,678,413
[45] Date of Patent: Oct. 21, 1997

[54] REFRIGERATOR AND METHOD FOR CONTROLLING TEMPERATURE THEREOF BY CONTROLLING COOL AIR DISCHARGE DIRECTION

[75] Inventors: Seong-wook Jeong, Suwon; Jae-in Kim, Seoul; Yun-seog Kang, Suwon; Suk-hang Park, Suwon; Yong-myoung Kim, Suwon, all of Rep. of Korea

[73] Assignee: Samsung Electronic, Co. Ltd., Suwon, Rep. of Korea

[21] Appl. No.: 568,449

[22] Filed: Dec. 7, 1995

[30] Foreign Application Priority Data

Dec. 10, 1994 [KR] Rep. of Korea ............. 94-33558
Dec. 12, 1994 [KR] Rep. of Korea ............. 94-33752
Oct. 25, 1995 [KR] Rep. of Korea ............. 95-37172

[51] Int. Cl.$^6$ ................................. F25D 17/06
[52] U.S. Cl. ................... 62/89; 62/186; 62/408
[58] Field of Search ............... 62/179, 186, 187, 62/407, 408, 404, 413, 414, 415, 416, 177, 178, 89

[56] References Cited

U.S. PATENT DOCUMENTS 2,907,186 10/1959 Barroero ........................ 62/408
4,738,116 4/1988 Himeno et al. ................. 62/186
5,214,936 6/1993 Lim et al. ...................... 62/407

*Primary Examiner*—Harry B. Tanner
*Attorney, Agent, or Firm*—Burns, Doane, Swecker & Mathis LLP

[57] ABSTRACT

A refrigerator having a cool air path and a cool air discharge control blade for distributing cool air and controlling the discharge direction thereof and a method for controlling refrigerator temperature by controlling a cool air discharge direction are provided. By placing a disk-shaped cool air guiding portion in a discharge hole, cool air is rapidly and uniformly distributed via the cool air path and by low-speed rotation of the cool air discharge control blade, thus keeping the refrigerator at a predetermined temperature. Temperature sensors are installed on each side of the refrigeration compartment and the sensed averages or representative temperatures are compared with control reference temperatures, so that cool air can be discharged to high temperature areas by controlling the cool air discharge direction such that the cool air discharge control blade is rotated to provide cool air flow depending on a sensed temperature difference.

22 Claims, 17 Drawing Sheets

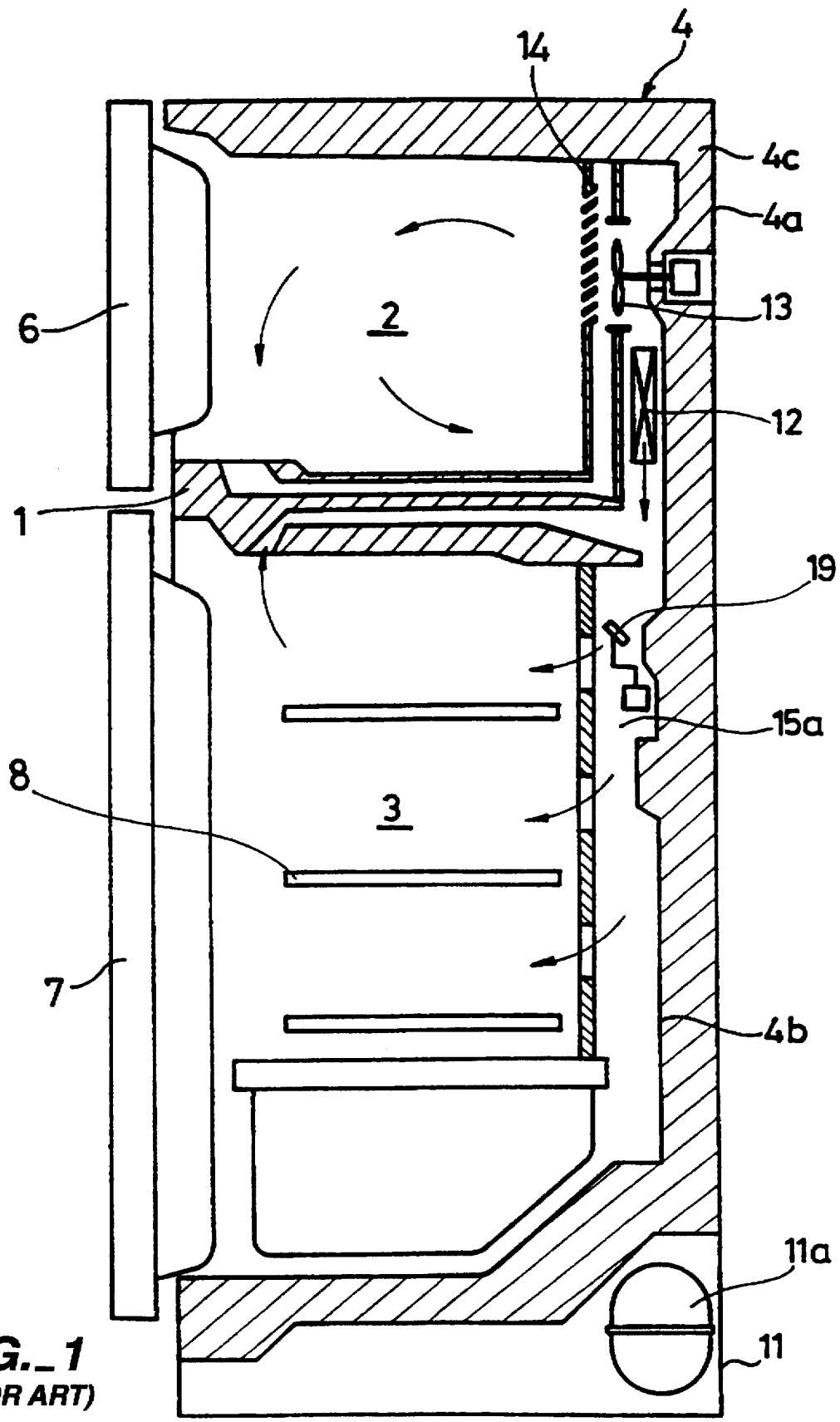
FIG._1
*(PRIOR ART)*

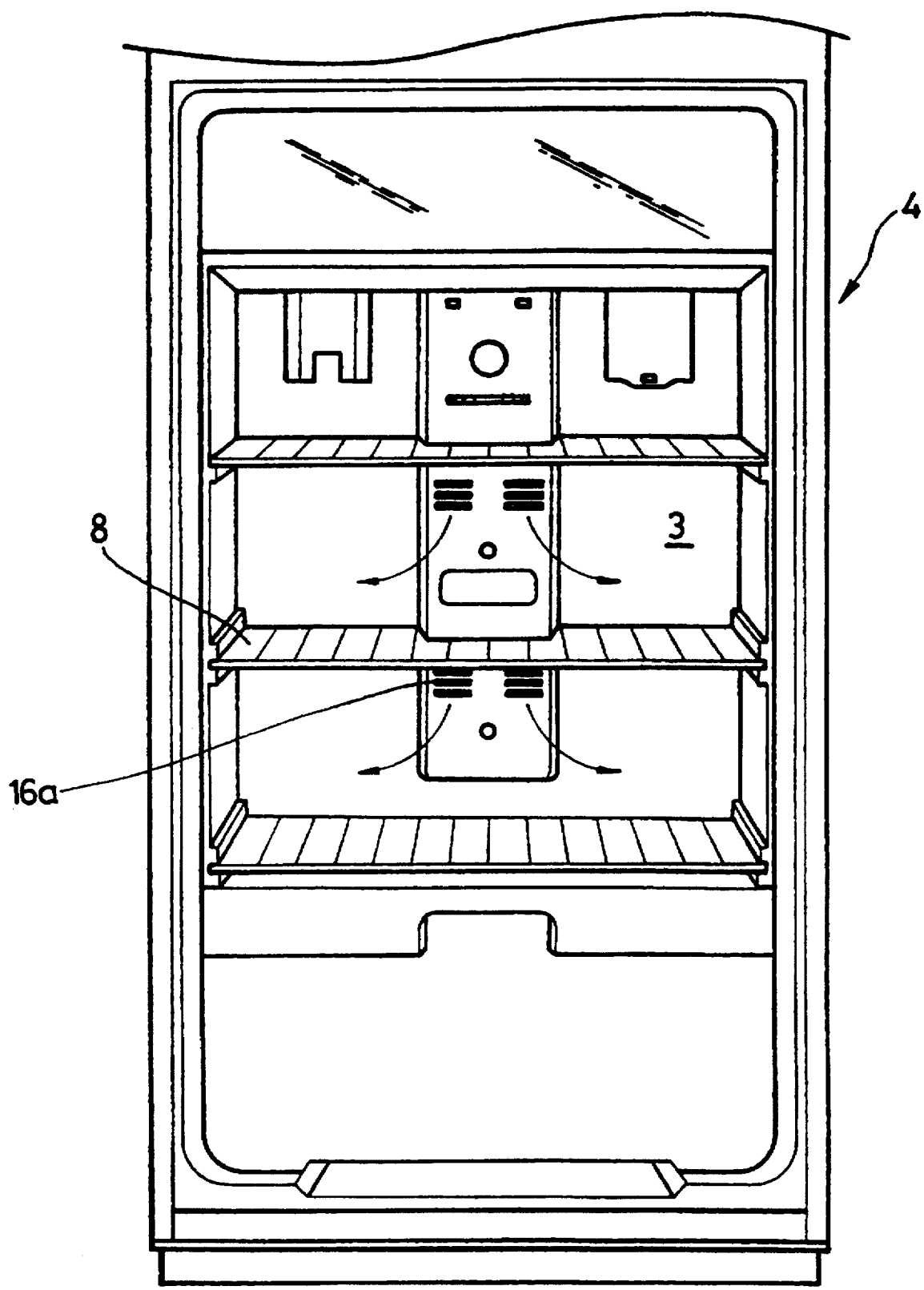
FIG._2
*(PRIOR ART)*

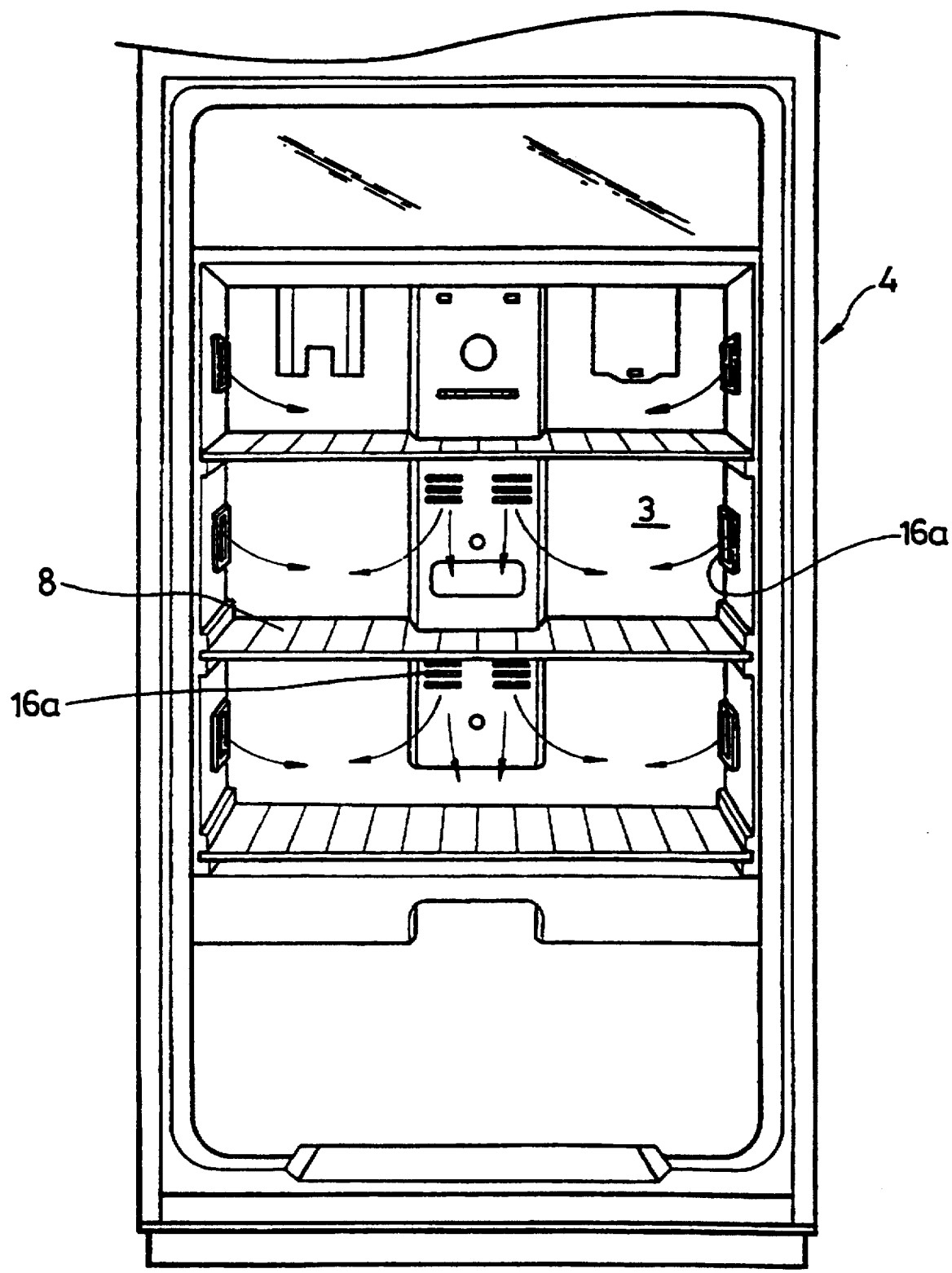
FIG._3
*(PRIOR ART)*

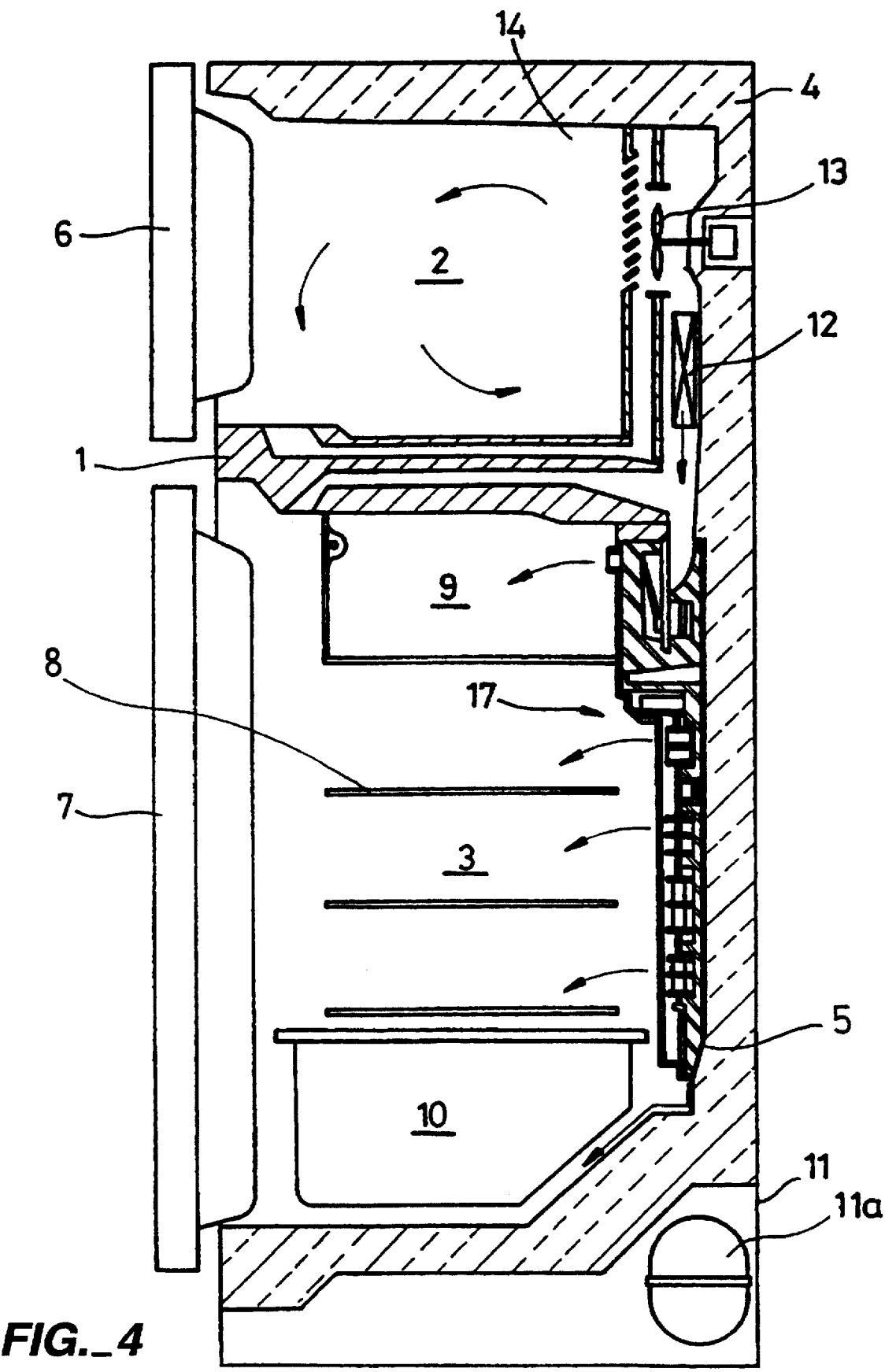
FIG._4

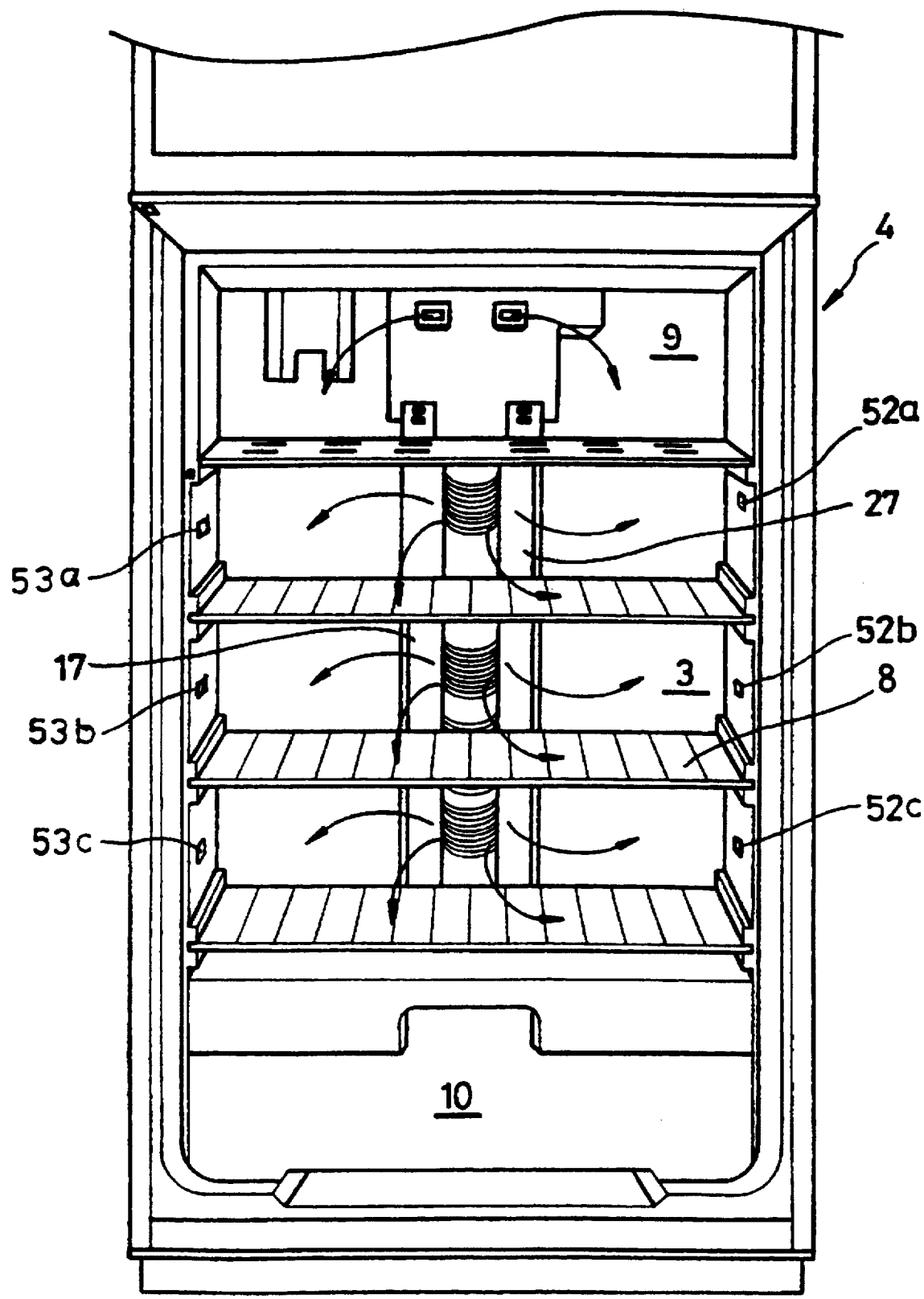
FIG._5

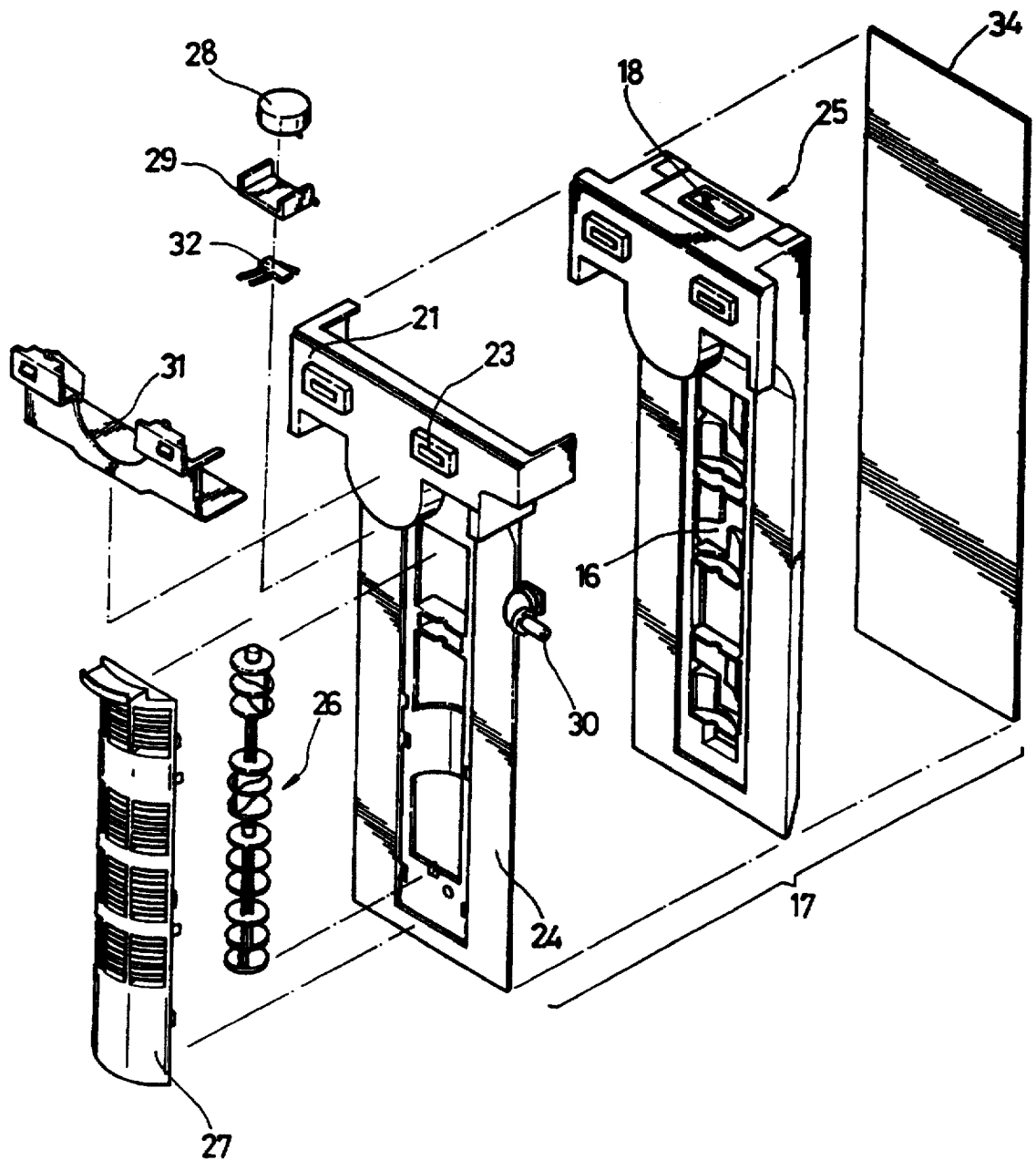
FIG._6

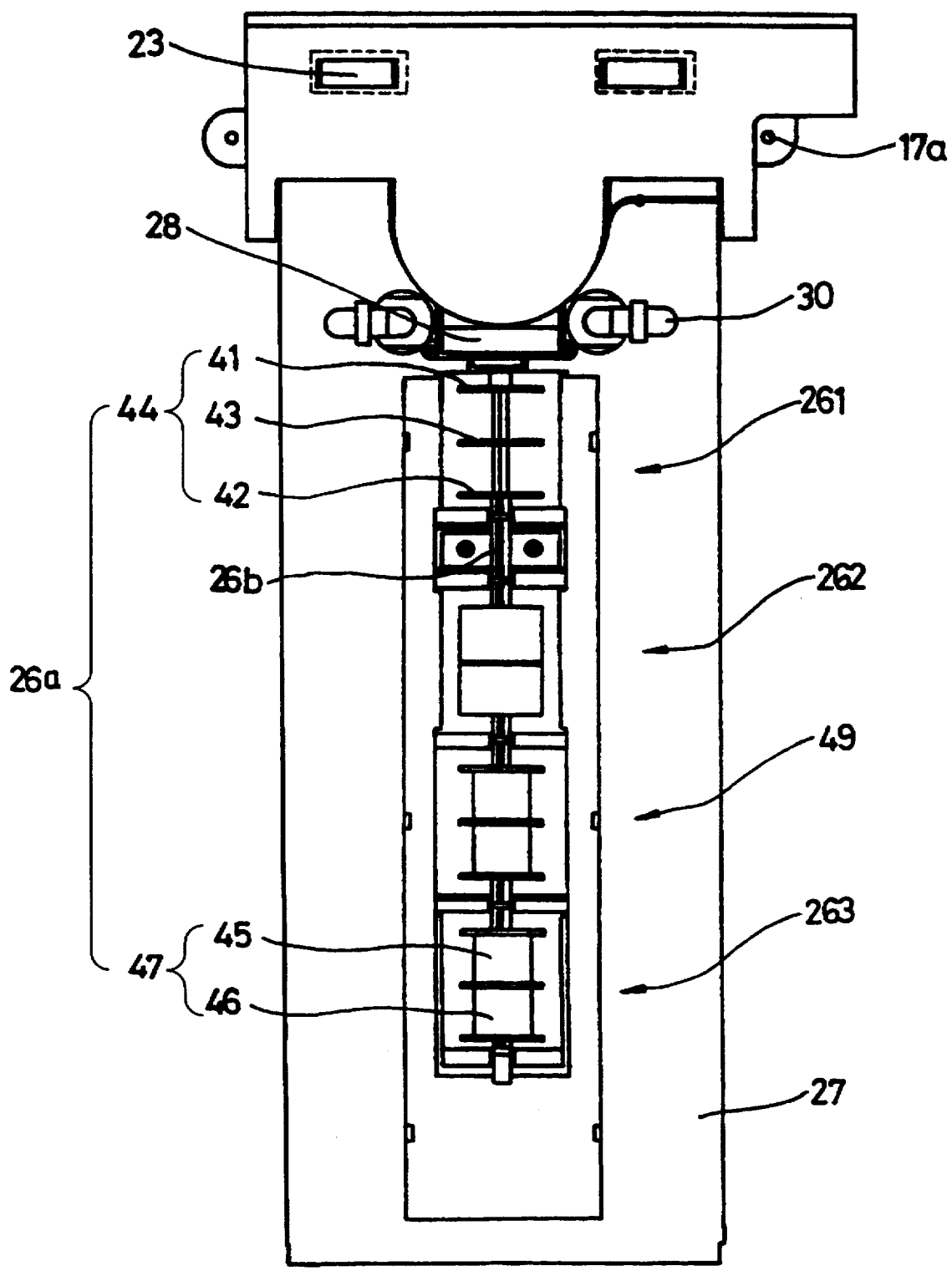
FIG._7A

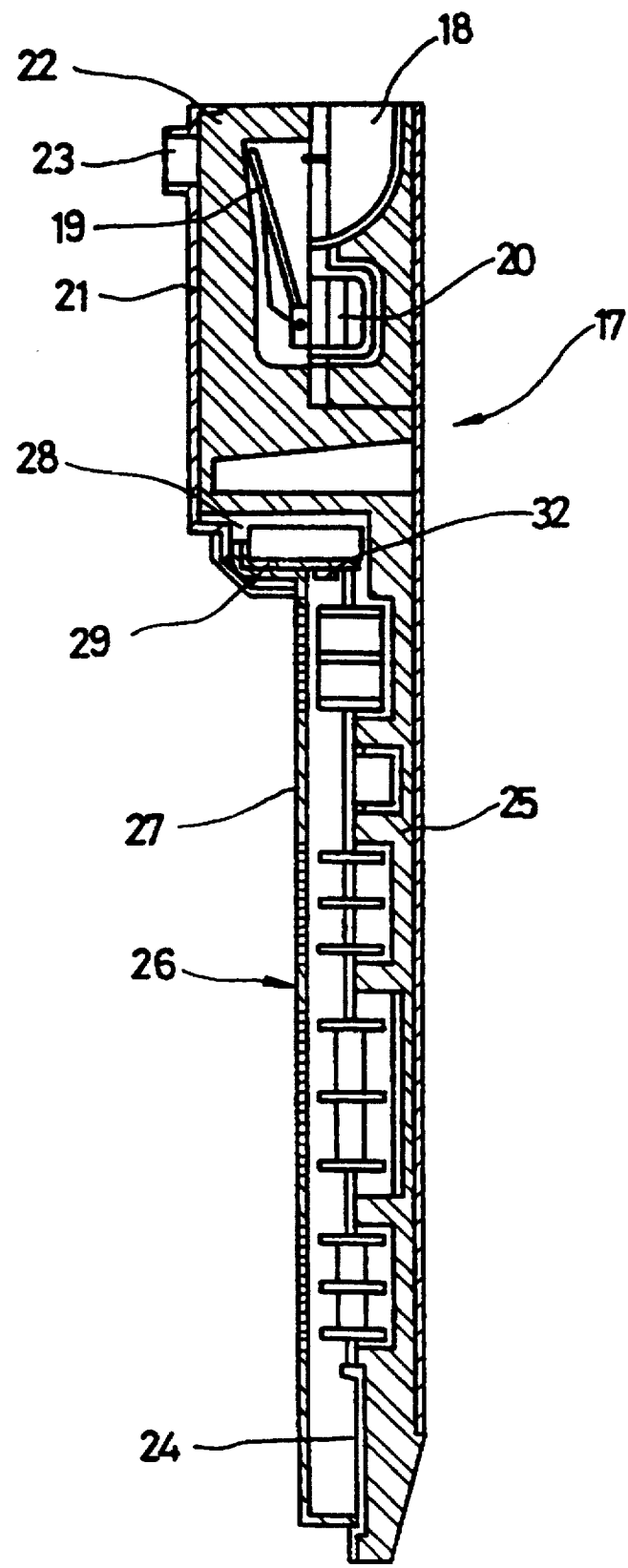
FIG._7B

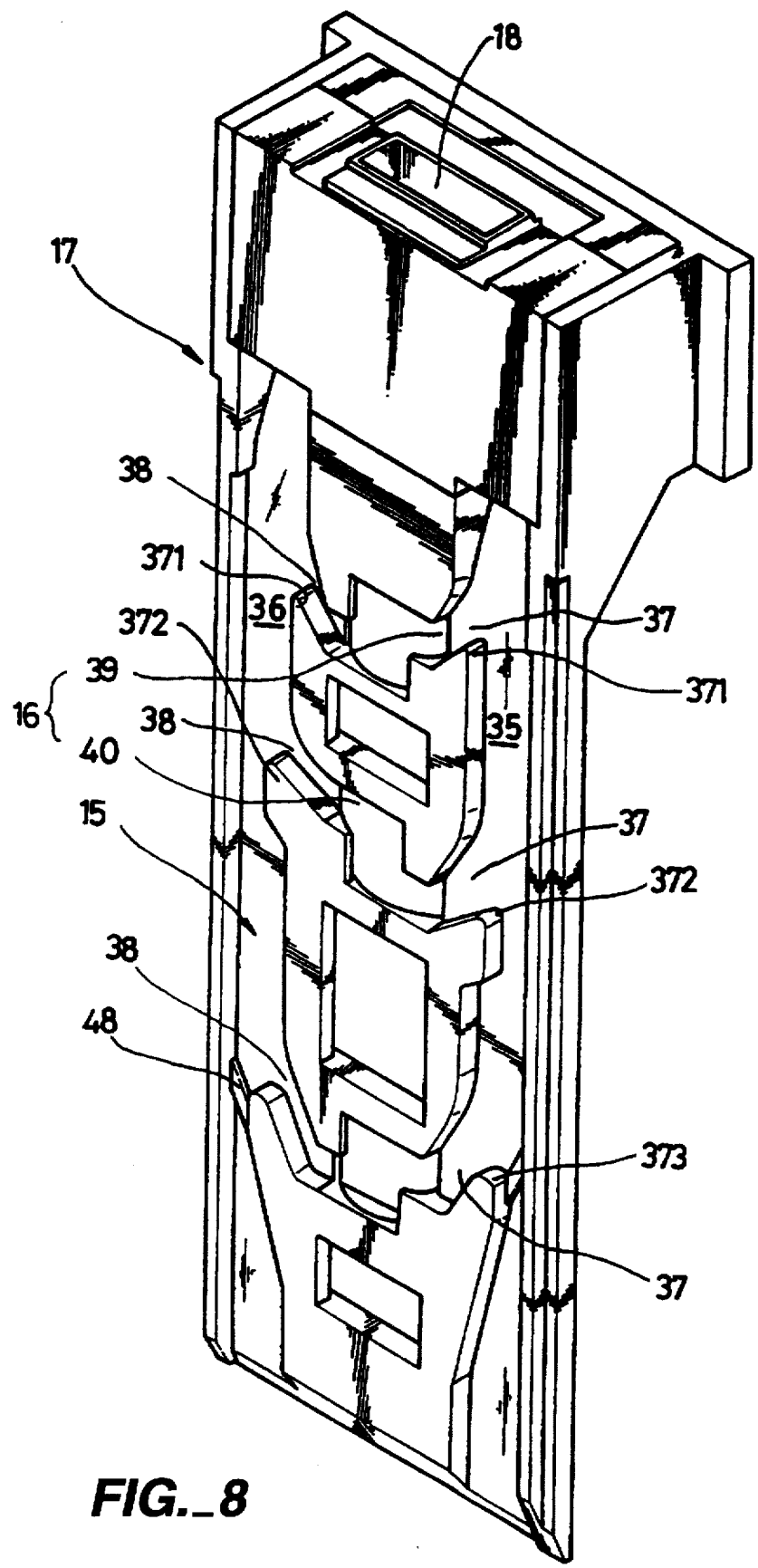
FIG._8

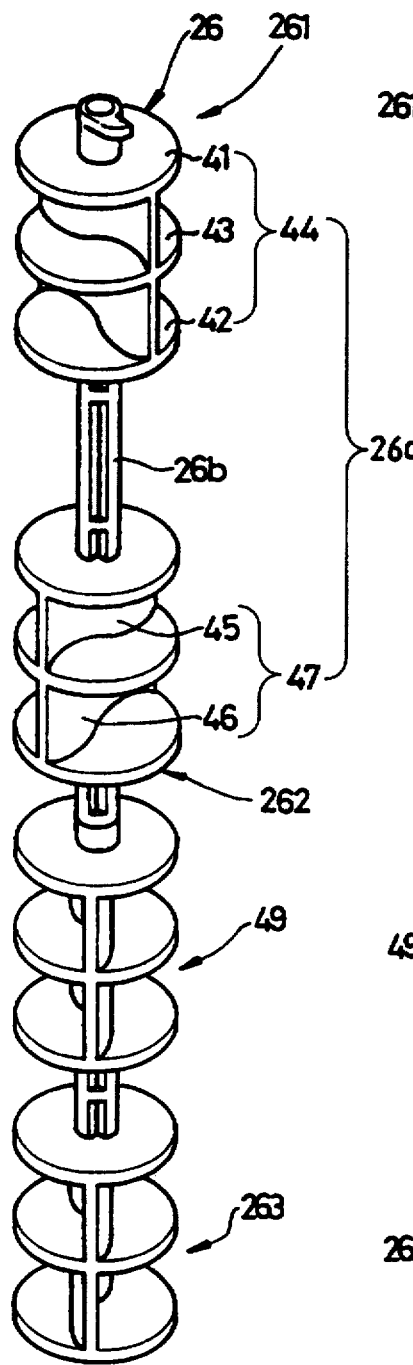
FIG._9A
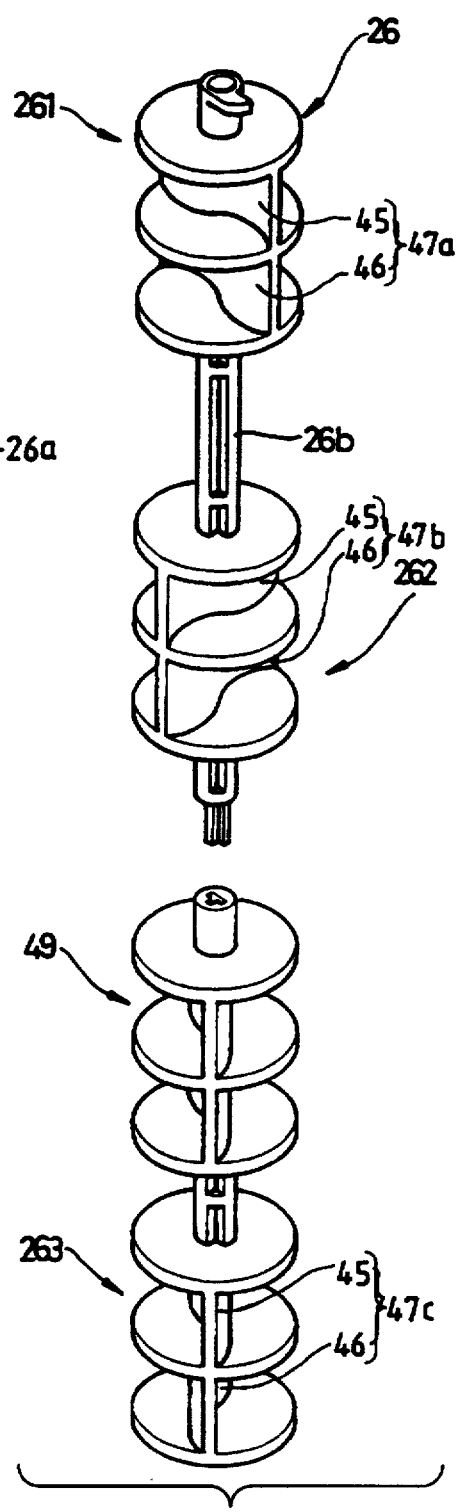
FIG._9B
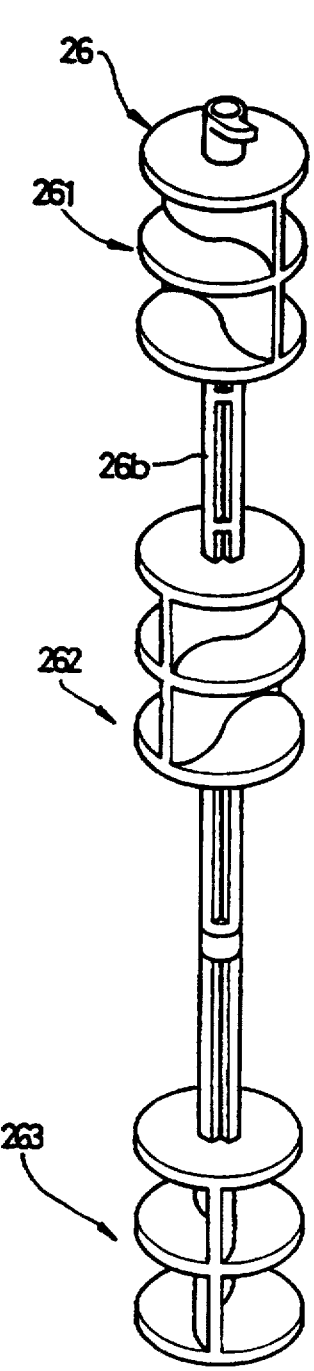
FIG._9C

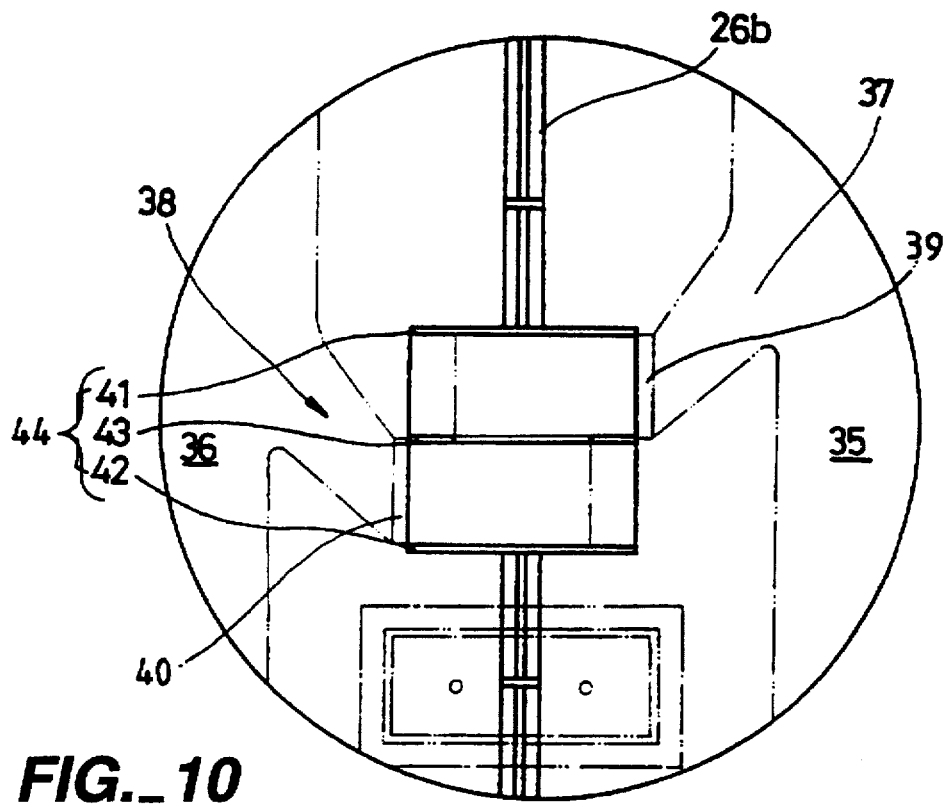
FIG._10
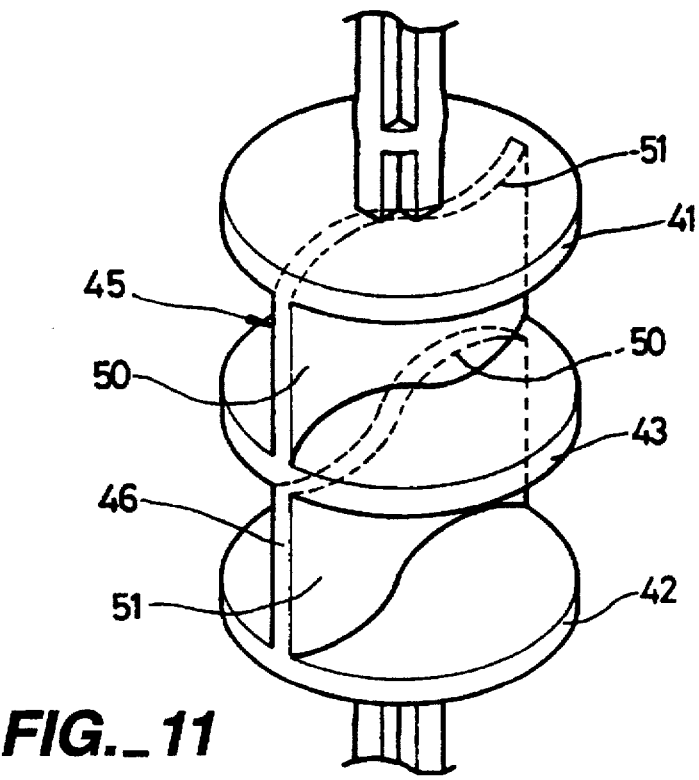
FIG._11

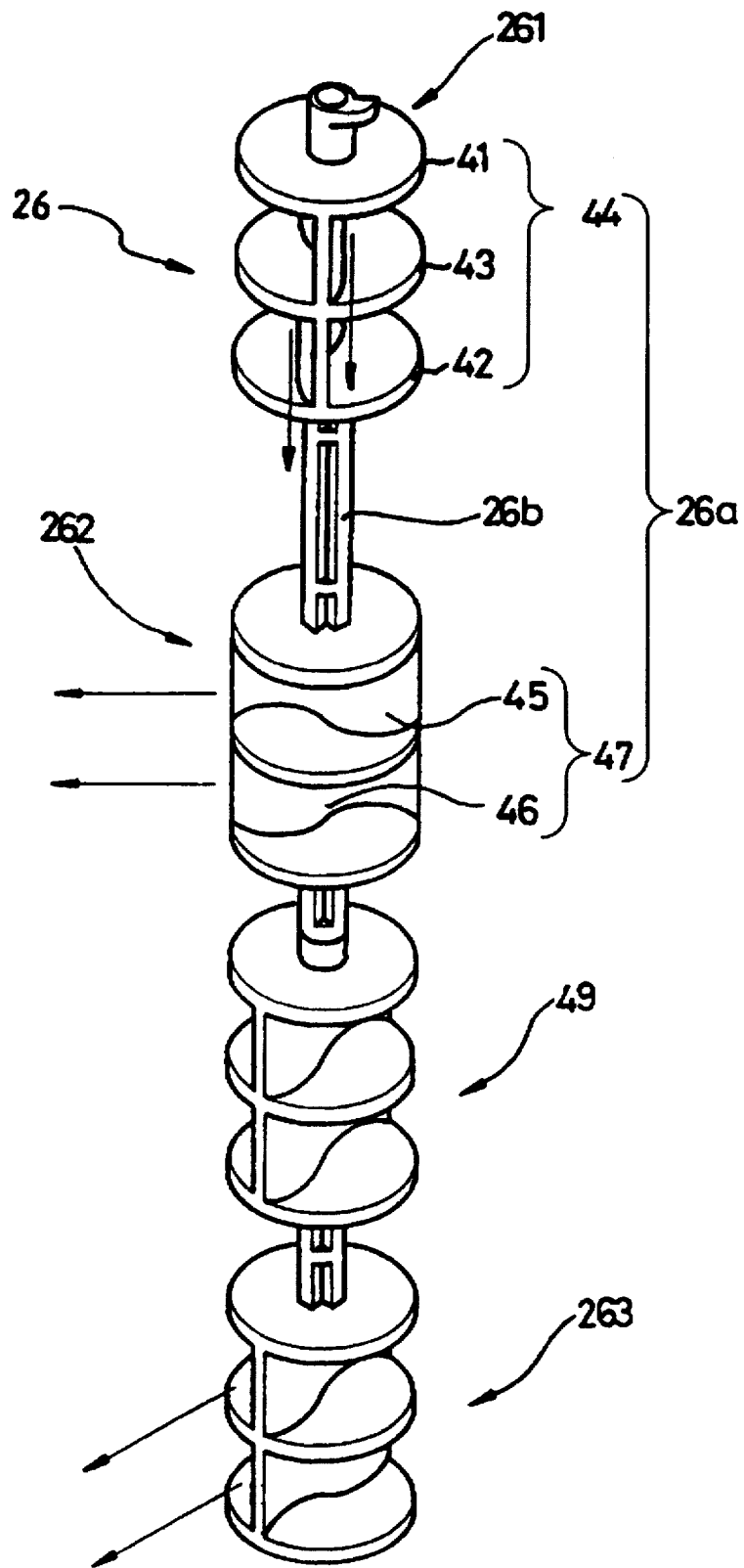
FIG._12A

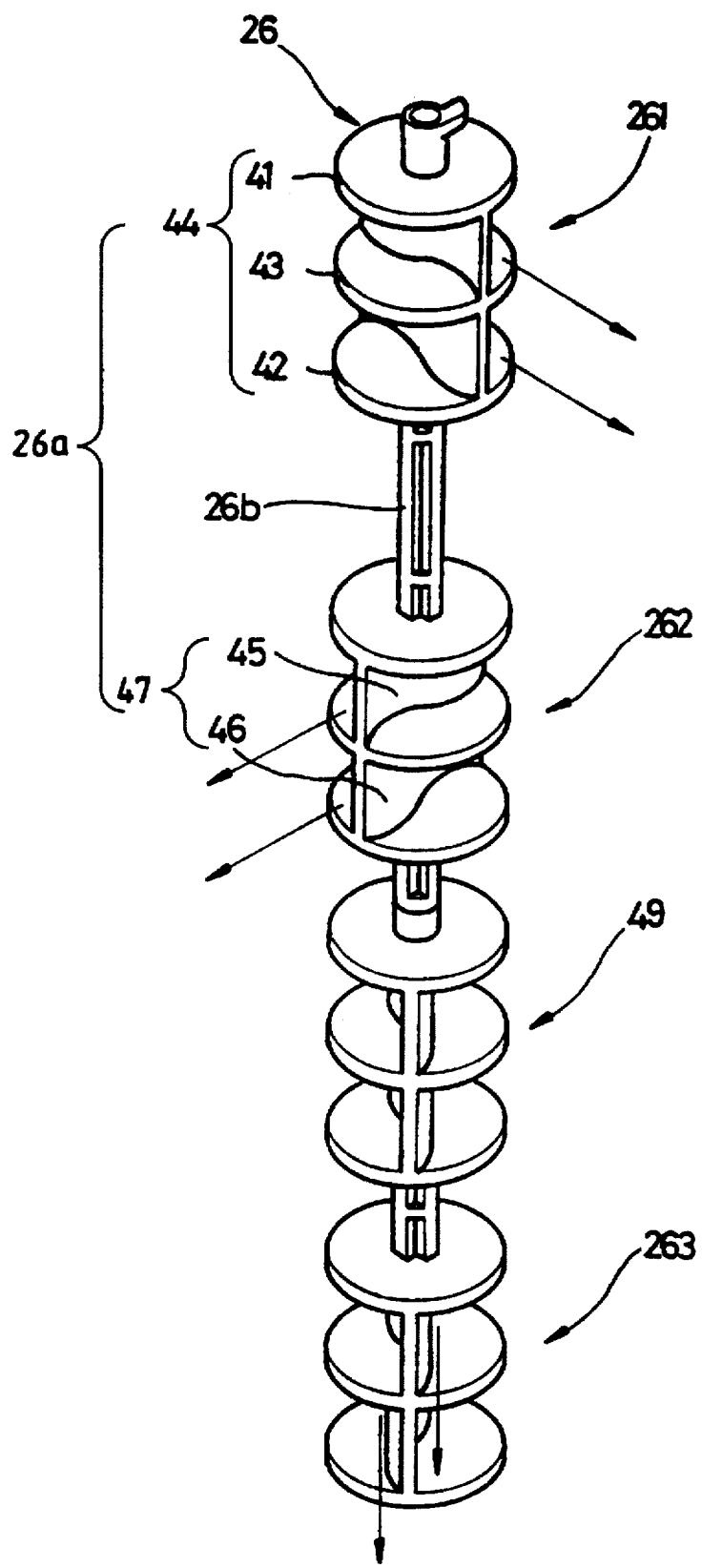
FIG._12B

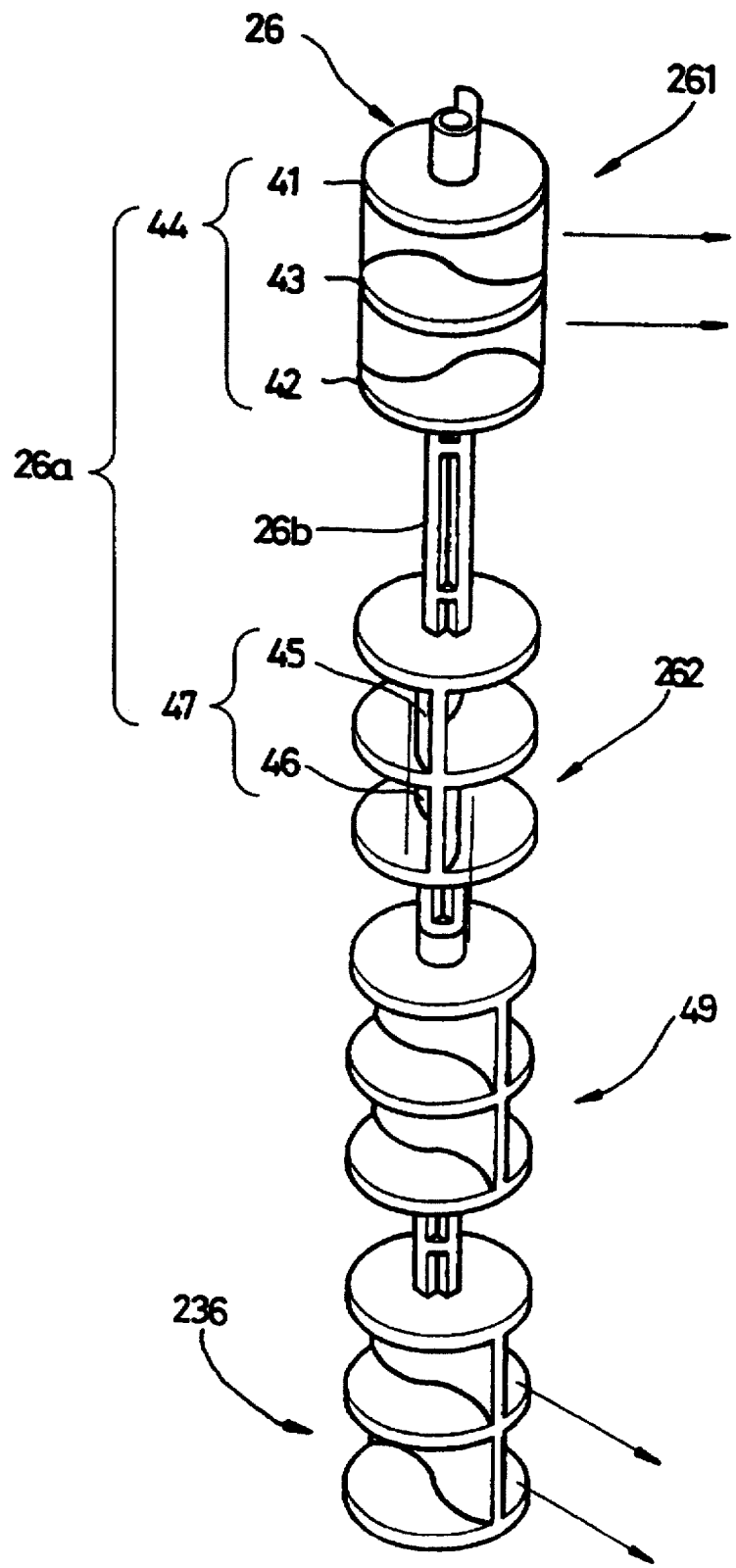
FIG._12C

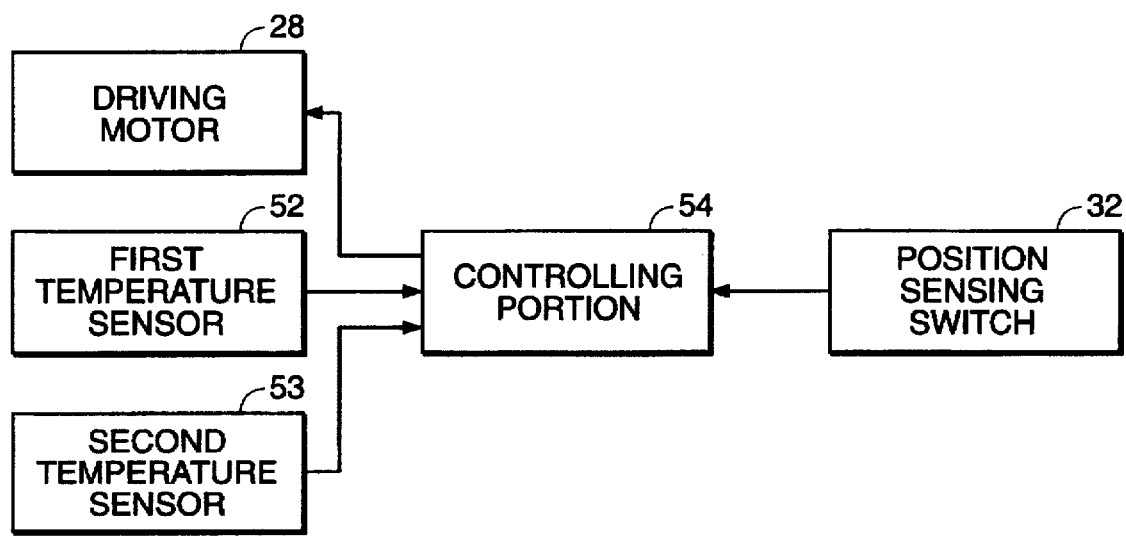
FIG._13
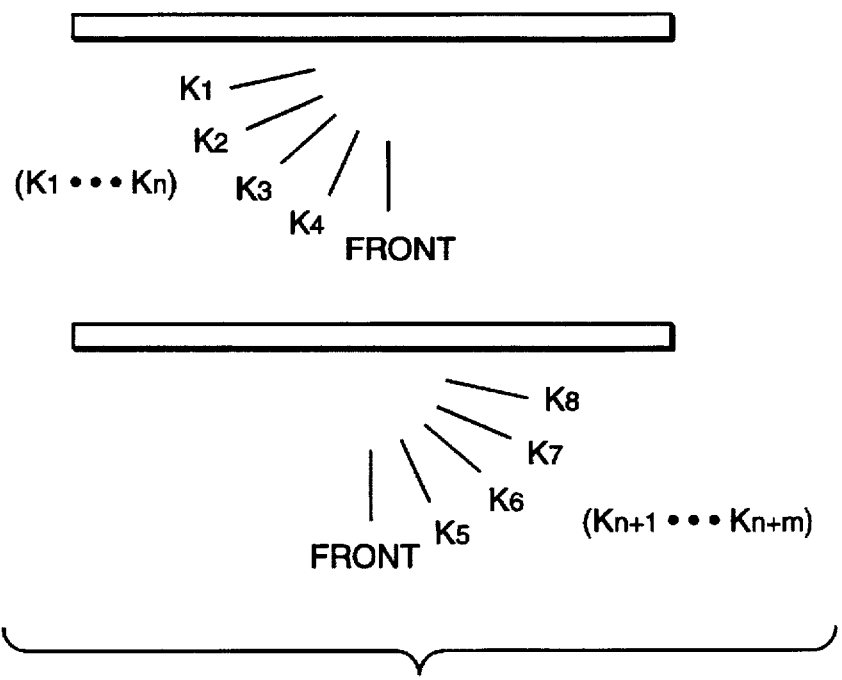
FIG._15

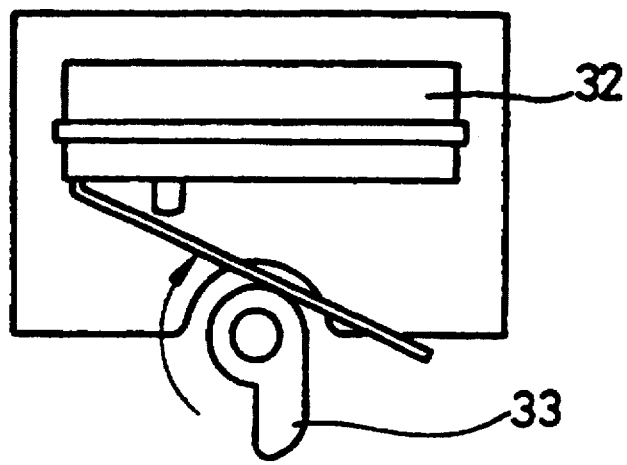
FIG._14A
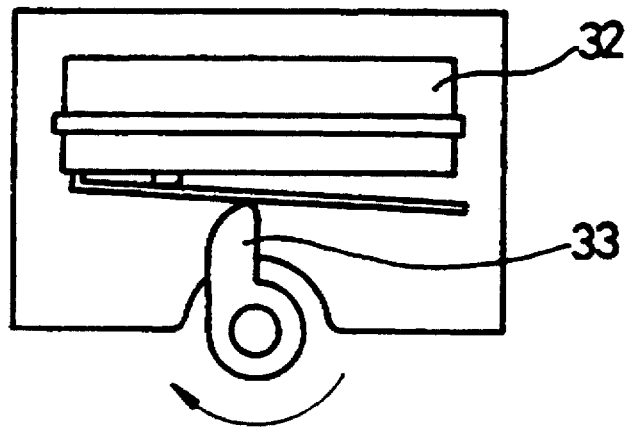
FIG._14B
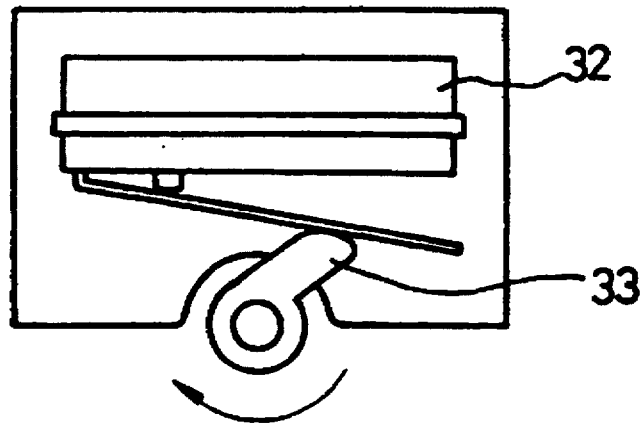
FIG._14C

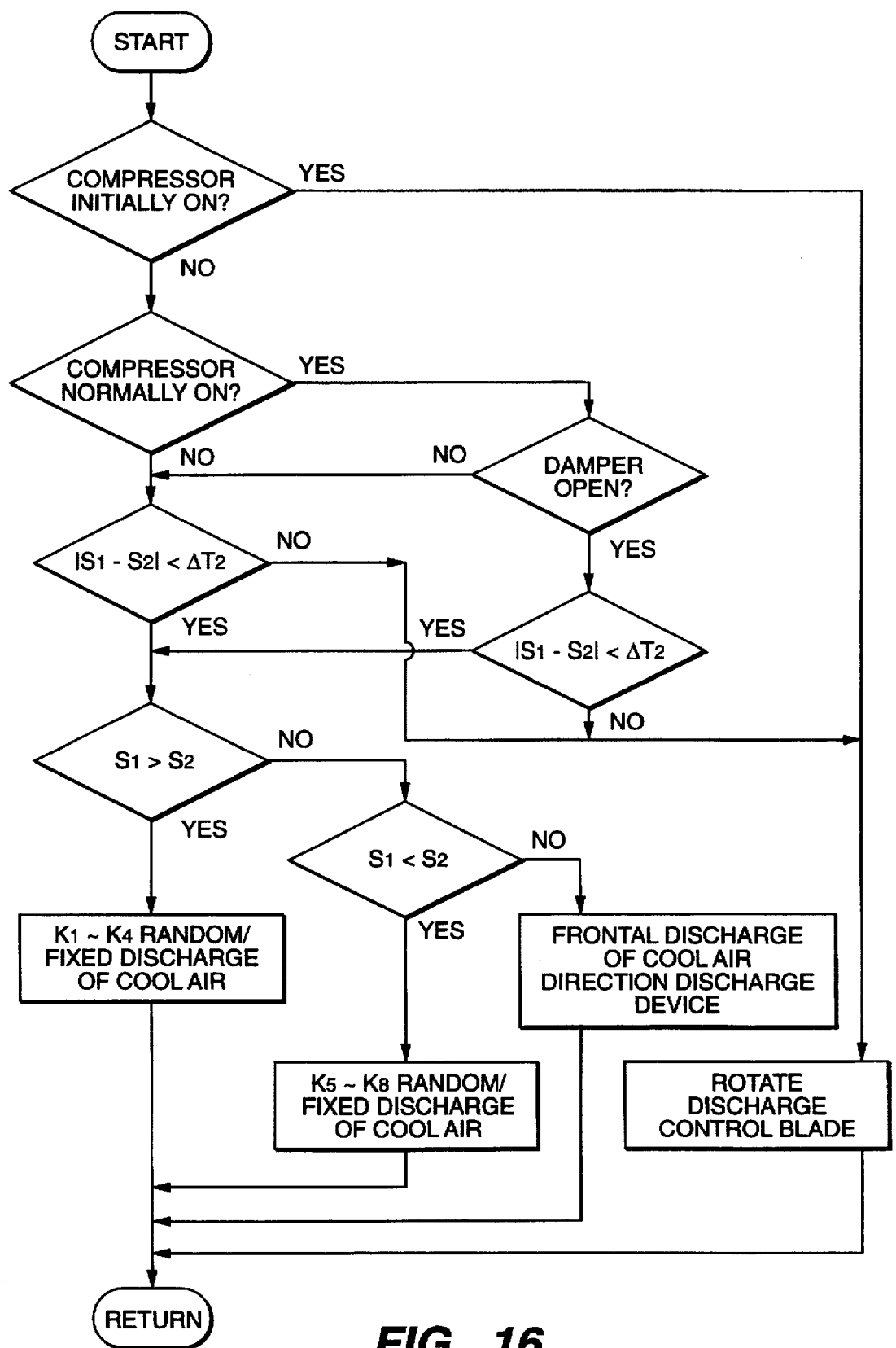
*FIG._16*

5,678,413

1

REFRIGERATOR AND METHOD FOR CONTROLLING TEMPERATURE THEREOF BY CONTROLLING COOL AIR DISCHARGE DIRECTION

BACKGROUND OF THE INVENTION

The present invention relates to a refrigerator and a method for controlling temperature thereof, and more particularly, to a refrigerator having a cooling fan and a cool air discharge adjustment blade for distributing the cool air discharged into a refrigeration compartment and controlling the discharge direction thereof, and a method for controlling the temperature of a refrigeration compartment to be rapidly and uniformly distributed by controlling the discharge direction of the cool air into the refrigeration compartment.

As shown in FIG. 1, a refrigerator is generally provided with a body 4 having a freezer compartment 2 and a refrigeration compartment 3 divided by an intermediate bulkhead 1, and doors 6 and 7 for freezer compartment 3 and refrigeration compartment 4 attached to body 4.

Body 4 is comprised of a cabinet 4a for defining a whole frame, a liner 4b in the inner part of cabinet 4a, and a foam material 4c which fills the space between cabinet 4a and liner 4b.

A compressor 11a is installed in a machine room 11 in the lower part of a refrigerator 3. A condenser (not shown) and a pressure-reducer (not shown) are installed in body 4 or in machine room 11. An evaporator 12 is installed on the rear wall of freezer compartment 2. These are connected by a refrigerant piping, thus performing a refrigeration circulation cycle. A cooling fan 13 is installed above evaporator 12 to forcibly blow cool air produced in evaporator 12 into freezer compartment 2 and refrigeration compartment 3. To guide the cool air, a fan guide 14 is placed in front of cooling fan 13 and a cool air duct 15a is provided along the rear wall of refrigeration compartment 3. A cool air control damper 19 serves to control the amount of the cool air provided to refrigeration compartment 3. Shelves 8 are used for mounting food thereon.

In general, a conventional refrigerator employs a section-by-section discharge method to provide cool air into a refrigeration compartment. As shown in FIG. 2, cool air discharge holes 16a are arranged vertically on cool air duct 15a provided on the rear wall of refrigeration compartment 3, for respective sections formed by shelves 8, thus discharging cool air into each section, in this method.

However, the refrigerator of this section-by-section discharge method shows its limits of effectiveness in achieving uniform refrigeration, since cool air is discharged just forward via cool air discharge holes 16a, causing large differences in temperatures of the left and right sides, and the front and rear parts in the refrigerator.

To circumvent this problem, a refrigerator adopting a three-dimensional refrigeration method has recently been suggested. As shown in FIG. 3, this refrigerator has cool air discharge holes 16a on both side walls as well as on the rear wall, for three-dimensionally discharging cool air.

The thus-constituted refrigerator also has limitations in maintaining a uniform temperature distribution between an area that cool air directly reaches and any other area, since the cool air is discharged just into the refrigerator and not distributed. Another problem with this refrigerator is that a particular area can not be refrigerated, when necessary, since the direction and amount of the discharged cool air cannot be controlled. These problems have emerged as a serious concern requiring an immediate solution in the trend of increased preference for a large refrigerator.

As an effort to solve the problems, a method of simply distributing discharged cool air is used. In the method, a cool air discharge adjustment blade for determining a cool air discharge direction into a refrigeration compartment is just rotated or kept in a predetermined direction for a predetermined time, to distribute the cool air discharged into a refrigeration compartment.

However, this temperature control method is not effective in handling unspecified temperature changing situations, immediately. That is, the discharge of cool air cannot be properly controlled on the basis of differences in temperatures between areas of a section or between sections which are caused by the temperature of stored food and opening and closing of doors.

SUMMARY OF THE INVENTION

The present invention is intended to overcome the above problems. It is an object of the present invention to provide a refrigerator in which (1) a uniform temperature distribution is maintained all over the areas of the refrigerator by distributing cool air discharged into the refrigerator and intensively discharging the cool air to a particular area requiring intensive refrigeration, (2) a driving motor is prevented from breaking down due to introduction and condensation of water, and (3) even though a cool air control blade rotates slowly, the cool air is discharged into the refrigerator, without directly flowing down, by placing a cool air guiding portion in a cool air discharge hole.

It is another object of the present invention to provide a method for controlling refrigerator temperature by controlling a cool air discharge direction in order to rapidly distribute cool air, thus keeping a refrigerator, especially a refrigeration compartment, at a predetermined temperature.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator into the refrigerator and a cool air path for guiding the cool air downward from the guide path; and a plurality of discharge holes formed in the housing, for guiding the cool air which flows through the cool air path to be dispersely discharged into the refrigeration compartment.

According to the present invention, the discharge holes are placed in the center of the housing. The cool air path is provided with a first path and a second path arranged in both sides of the discharge holes.

The plurality of discharge holes are vertically arranged to correspond to their respective sections of the refrigeration compartment. The cool air path is further provided with first linking paths for linking respective discharge holes to the first path and second linking paths for linking respective discharge holes to the second path.

It is desirable that each discharge hole is provided with a first discharge portion directly connected to the first linking path and a second discharge portion directly connected to the second linking path, the first discharge portion is communicated with the second discharge portion, and the first and second discharge portions are formed to be mutually stepped and eccentric toward the first linking path and the second linking path, respectively.

Preferably, the upper parts of the first and second linking paths are rounded, and the lower parts thereof are extended more outward than the upper parts by protrusions.

It is desirable that as a protrusion is positioned in a lower place, the protrusion is extended more outward.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator into the refrigerator and a cool air path for guiding the cool air downward from the guide path; a plurality of discharge holes formed in the housing, for guiding the cool air which flows through the cool air path to be discharged into the refrigeration compartment; a cool air discharge adjustment blade rotatably installed in the housing, for controlling a direction in which the cool air is discharged from the discharge holes; and a driving motor for rotating the cool air discharge adjustment blade.

According to the present invention, the cool air discharge adjustment blade is provided with a distribution plate including an upper plate, a lower plate and a middle plate which are vertically spaced by predetermined distances, and a dispersion guiding blade including a first dispersion guiding blade for vertically connecting the upper and middle plates and a second dispersion guiding blade for connecting the middle and lower plates.

The cool air discharge adjustment blade is provided with a cool air guiding portion including the distribution plates and the dispersion guiding blades, the cool air guiding portion is provided with an upper cool air guiding portion, a middle cool air guiding portion, and a lower cool air guiding portion corresponding to upper, middle and lower parts of the refrigeration compartment, respectively, and these cool air guiding portions are integrally connected by a supporting shaft.

The refrigerator further comprises first temperature sensors installed on one side wall of each section of the refrigeration compartment, second temperature sensors installed on the other side wall thereof, a position sensing switch for turning on and off in accordance with the rotative position of the cool air discharge adjustment blade, and a control portion electrically connected to the first temperature sensors, the second temperature sensors and the position sensing switch, for determining the rotative position of the cool air discharge adjustment blade.

To achieve the above object, there is provided a refrigerator comprising: a body having a freezer compartment and a refrigeration compartment; an evaporator for producing cool air and providing the cool air to the freezer and refrigeration compartments; a housing installed in a predetermined position of the refrigeration compartment and having a guide path for guiding the cool air from the evaporator to the refrigeration compartment; cool air paths formed in both sides of the housing to be communicated with the guide path and having a first path and a second path to guide the cool air from the guide path; a plurality of discharge holes arranged between the first path and the second path, for guiding the cool air to be discharged into the refrigeration compartment through the cool air paths; a cool air discharge adjustment blade rotatably installed in the front surface of the housing, for distributing left and right or collecting the cool air from the discharge holes; and a driving motor for rotating the cool air discharge adjustment blade.

The refrigerator further comprises first temperature sensors installed on one side wall of each section of the refrigeration compartment, second temperature sensors installed on the other side wall thereof, a position sensing switch for turning on and off in accordance with the rotative position of the cool air discharge adjustment blade, and a control portion electrically connected to the first temperature sensors, the second temperature sensors and the position sensing switch, for determining the rotative position of the cool air discharge adjustment blade.

A motor case is installed in the housing above the cool air discharge adjustment blade, for accommodating a driving motor, and an indoor light is installed adjacent to the motor case in the housing.

To achieve the above object, there is provided a refrigerator according to the present invention, comprising: a housing installed on the rear wall of a refrigeration compartment; a cool air path installed within the housing, for guiding cool air; a plurality of discharge holes communicated with the cool air path; a cool air discharge adjustment blade rotatably installed in each discharge hole; and a driving motor accommodated in a motor case, installed in the housing above the cool air discharge adjustment blade, for driving the cool air discharge adjustment blade.

In the present invention, a position sensing switch is provided below the driving motor to be interlocked with an operation protrusion provided above the cool air discharge adjustment blade, the operation protrusion rotating with the cool sir discharge adjustment blade, and an indoor light is installed adjacent to the driving motor.

To achieve the above object, there is provided a refrigerator according to the present invention, comprising: a housing installed on the rear wall of a refrigeration compartment; a cool air path installed within the housing, for guiding cool air; a plurality of discharge holes communicated with the cool air path; at least one plate member rotatably placed in each discharge hole, for horizontally guiding the cool air discharged from the discharge holes; and a dispersion guiding blade vertically connected with the plate member, for dispersing the cool air.

In the present invention, it is desirable that the cool air path is divided into a first path and a second path which are parallel to each other.

To achieve the above object, there is provided a refrigerator having a cool air dispersion device installed on the rear wall of a refrigeration compartment, for keeping a uniform temperature distribution in the refrigeration compartment, the refrigerator comprising: a housing; a guide path installed within the housing, for guiding cool air; a first path and a second path in parallel with each other and provided in the housing separately from the guide path; a plurality of discharge holes installed in a predetermined place between the first path and the second path, respectively communicating with the first path and the second path; a plurality of cool air discharge adjustment blades rotatably placed to correspond to each discharge hole for dispersedly discharging the cool air from the first and second paths into the refrigeration compartment; a grill facing the cool air discharge adjustment blades, for protecting the cool air discharge adjustment blades.

To achieve the above object, there is provided a method for controlling refrigerator temperature by controlling a cool air discharge direction, according to the present invention, the method comprising the steps of:

(a) determining whether a refrigerant circulating compressor is initially turned on, when power is applied;

(b) determining whether the compressor is normally turned on, when the compressor is not initially turned on;

(c) determining whether a damper is opened, when the compressor is normally turned on;

(d) determining whether a control reference temperature for discharge of cool air is larger than the absolute value of a difference between the average value of first temperatures sensed by first direction temperature sensing means and the average value of second temperatures sensed by second direction temperature sensing means, the first and second direction temperature sensing means being disposed to face each other a predetermined distance apart, when the damper is opened;

(e) determining whether a control reference temperature for non-discharge of cool air is smaller than the absolute value, when the compressor is not normally on;

(f) determining whether if the absolute value is smaller than the control reference temperature for discharge of cool air, when the damper is not opened;

(g) determining whether the first direction average value is larger than the second direction average value, when the absolute value is smaller than the control reference temperature for non-discharge of cool air;

(h) determining whether the first direction average value if larger than the second direction average value, when the absolute value is smaller than the control reference temperature for discharge of cool air;

(i) uniformly distributing cool air by rotating a cool air discharge control blade, if the compressor is initially on;

(j) dispersedly providing the cool air by rotating the cool air discharge control blade, when the absolute value is not smaller than the reference temperature for discharge of cool air;

(k) dispersedly providing the cool air by rotating the cool air discharge control blade, when the absolute value is not smaller than the control reference temperature for non-discharge of cool air;

(l) providing the cool air in a first direction by keeping the cool air discharge control blade at an angle of the first direction, if the first direction average value is larger than the second direction average value;

(m) determining whether the first direction average value is smaller than the second direction average value;

(n) providing the cool air in a second direction by keeping the cool air discharge control blade at an angle of the second direction, if the first direction average value is smaller than the second direction average value; and (o) providing the cool air to the front by directing the cool air discharge control blade to the front, if the first direction average value is equal to the second direction average value.

Preferably, in the step (l), the cool air discharge control blade is fixed to discharge the cool air at a predetermined angle of the first direction or swings at random in the first direction, in accordance with the remainder obtained by subtracting the second direction average value or representative value from the first direction average value or representative value.

It is desirable that in the step of (m), the cool air discharge control blade is fixed to discharge the cool air at a predetermined angle of the second direction or swings at random in the second direction, in accordance with the remainder obtained by subtracting the first direction average value or representative value from the second direction average value or representative value.

BRIEF DESCRIPTION OF THE DRAWINGS

The above objects and advantages of the present invention will become more apparent by describing in detail preferred embodiments thereof with reference to the attached drawings in which:

FIG. 1 is a whole vertical sectional view of a general refrigerator;

FIG. 2 is an inner perspective view of a conventional refrigerator employing a section-by-section cool air discharge method;

FIG. 3 is an inner perspective view of a conventional refrigerator employing a three-dimensional refrigeration method;

FIG. 4 is a whole vertical sectional view of a refrigerator according to the present invention;

FIG. 5 is an inner perspective view of a refrigeration compartment in the refrigerator of FIG. 4, with the door of the refrigeration compartment opened;

FIG. 6 is an exploded perspective view of a housing and a cool air discharge adjustment blade for discharging cool air to be dispersed in the refrigerator of FIG. 4;

FIGS. 7A and 7B are an enlarged front view and an enlarged side view of the cool air discharge portion shown in FIG. 4, respectively;

FIG. 8 is a rear perspective view of the housing of the refrigerator shown in FIG. 4, for showing an arrangement relationship between cool air paths and cool air discharge holes;

FIGS. 9A, 9B and 9C are views of the cool air discharge adjustment blade shown in FIG. 4 and exemplary modifications thereof;

FIG. 10 is a view showing an arrangement relationship between the discharge holes and the cool air discharge adjustment blade in the refrigerator of FIG. 4;

FIG. 11 is a plan view of the cool air discharge adjustment blade shown in FIGS. 9A, 9B and 9C;

FIGS. 12A, 12B and 12C are views showing a left-, center- and right-concentrated refrigeration mechanisms in the refrigerator of FIG. 4;

FIG. 13 is a block diagram showing the constitution of a control portion in the refrigerator of FIG. 4;

FIGS. 14A, 14B and 14C are views showing operations of a position sensing switch in FIG. 6;

FIG. 15 is an explanatory diagram showing control angles of the cool air discharge adjustment blade for controlling a cool air discharge direction according to the present invention; and FIG. 16 is a flow-chart of a method for controlling a temperature of a refrigerator by controlling a cool air discharge direction according to the present invention.

DETAILED DESCRIPTION OF THE INVENTION

FIG. 4 is a whole side sectional view of a refrigerator according to the present invention. As shown in the drawing, the refrigerator is provided with a body 4 of an insulation structure having a freezer compartment 2 and a refrigeration compartment 3 divided by an intermediate bulkhead 1, and doors 6 and 7 for freezer compartment 2 and refrigeration compartment 3 which are attached to body 4. There are a plurality of shelves 8 for mounting food thereon in refrigeration compartment 3. An auxiliary compartment 9 for storing particular food at a particular temperature is formed above refrigeration compartment 3 and a crisper 10 is formed independently below refrigeration compartment 3. A compressor 11a is installed in a machine room 11 below crisper 10. A condenser (not shown) and a pressure-reducer (not shown) are installed within body 4 or installed in machine room 11. An evaporator 12 is installed on the rear wall of freezer compartment 2. All these are connected by a refrigerant piping, thereby to perform a refrigeration circulation cycle.

A cooling fan 13 is installed above evaporator 12 to forcibly blow cool air produced in evaporator 12 into freezer compartment 2 and refrigeration compartment 3. A fan guide 14 is disposed in front of cooling fan 13 to guide the cool air. A housing 17 having a cool air path 15 and discharge holes 16 is installed on the rear wall of refrigeration compartment 3 (see FIG. 8). Thus, the cool air is provided from evaporator 12 to freezer compartment 2 and refrigeration compartment 3, separately. A concave groove 5 is formed into the rear wall of refrigeration compartment 3, for installing housing 17.

As shown in FIG. 5, housing 17 is installed in the center of the rear wall of refrigeration compartment 3 so that its upper portion is placed just behind auxiliary compartment 9 and the other portion thereof is located immediately behind refrigeration compartment 3 between auxiliary compartment 9 and crisper 10. That is, the upper end of housing 17 is extended to contact middle bulkhead 1 and the lower end thereof is extended near crisper 10, thus making housing 17 almost as high as refrigeration compartment 3.

As shown in FIG. 6, housing 17 is comprised of a front plate 24, a similarly-shaped thermal insulator 25 to be combined with front plate 24, a seal plate 34 attached to the rear surface of thermal insulator 25. A cool air discharge adjustment blade 26 is detachably installed on front plate 24, and a driving motor 28 is installed above cool air discharge adjustment blade 26, being accommodated in a motor case 29, for driving cool air discharge adjustment blade 26. Indoor lights 30 are installed in both sides of driving motor 28 and indoor light covers 31 serve to protect indoor lights 30.

In the embodiment, the introduction of moisture into the driving motor 28 is prevented by disposing driving motor 28 above cool air discharge adjustment blade 26. Thus, moisture or condensed water which may be generated does not directly in the refrigerator flow down due to their weights. Further, motor case 29 prevents permeation of the moisture into driving motor 28 and decrease of its driving speed by over-freezing. Even if moisture is introduced, the moisture is evaporated immediately by indoor lights 30 installed in both sides of driving motor 28, thereby preventing the break-down of driving motor 28 and thus inactive operation of cool air discharge adjustment blade 26. Though a geared motor having a fixed rotative speed is usually used as a driving motor in the embodiment, a stepping motor may be used instead, to properly control the rotating speed as well as the direction of the rotation of the cool air discharge adjustment blade.

A position sensing switch 32 is turned on and off by an operating protrusion (described later with respect to FIGS. 14A-14C) placed in the upper portion of cool air discharge adjustment blade 26, for controlling the rotative position of cool air discharge adjustment blade 26. A latticed grill 27 is detachably inserted into front plate 24, for protecting cool air discharge blade 26. Grill 27 serves to prevent stored food in the refrigerator from disturbing the operation of cool air discharge control blade 26.

As shown in FIGS. 7A and 7B, a guide path 18 is formed in the upper end of housing 17, for guiding cool air produced from evaporator 12 into refrigeration compartment 3. A damper 19 for controlling the amount of cool air provided to the refrigeration compartment by opening/closing guide path 18 and a damper motor 20 for driving damper 19 are built in the upper end of housing 17. Temperature in refrigeration compartment 3 is controlled by using these constituents in a conventional manner. A damper cover 21 is incorporated in front plate 24 in the embodiment and a spacer 22 is formed of an insulating material. Spacer 22 is made thick to prevent condensation on damper cover 21 which results from a large amount of cool air passing through guide path 18. Therefore, the upper part of housing 17 having damper 19 and damper motor 20 installed therein is also made relatively thick and wide, but its exact dimensions depend on the approximate dimensions of the refrigerator itself. (For a 400-500 l refrigerator, the thickness and width of the housing and are preferably 12 cm and 34 cm, respectively.) A cool air discharge hole 23 formed into damper cover 21 serves to discharge cool air from guide path 18 to auxiliary compartment 9. Thus, auxiliary compartment 9 is maintained at a lower temperature than refrigeration compartment 3. Two cool air discharge holes 23 are arranged in this embodiment.

Meanwhile, the middle and lower parts of housing 17 other than the upper part are approximately 3 cm thick and 25 cm wide. These middle and lower parts of housing 17 may be entirely formed of a plastic injected material. In the embodiment, these middle and lower parts are constituted of 2 mm-thick front plate 24 of a plastic injected material and an thermal insulator of, for example, polystyrene, which are integrally formed. Cool air discharge adjustment blade 26 is installed in these portions of housing 17 and comprised of a cool air guiding portion 26a and a supporting shaft 26b. In the embodiment, four cool air guiding portions 26a are integrally connected with supporting shaft 26b. Cool air guiding portions are placed to correspond to respective sections divided by shelves 8 in refrigeration compartment 3. Assuming that the height of refrigeration compartment 3 is H, the upper cool air guiding portion is placed at ¾H, the middle cool air guiding portion at ½H, and the lower cool air guiding portion at ⅓H. A cool air guiding portion between the middle cool air guiding portion and the lower cool air guiding portion is prepared in consideration of the appearance of the cool air guiding portions and mold manufacturing, regardless of positions of shelves 8. The constitution of cool air discharge adjustment blade 26 will be described later in more detail.

Housing 17 is installed as an assembly body on the surface of the rear wall of refrigeration compartment 3. It is desirable to install housing 17 so that the front plate of housing 17 is level with the surface of the rear wall of refrigeration compartment 3. That is, after front plate 24 and thermal insulator 25 are integrally formed and seal plate 24 is attached to thermal insulator 25, cool air discharge adjustment blade 26 and grill 27 are combined in front plate 24, driving motor 28 and indoor lights 30 are combined, and then installed onto the rear wall of refrigeration compartment 3. Thus, installing work is facilitated, as compared to separately installing each constituent in a refrigeration compartment. A screw combining portion 17a is used for installing housing 17. That is, since housing 17 is an assembly body, housing 17 is easily installed on the rear wall of refrigeration compartment 3 through screw-combination.

As shown in FIG. 8, cool air path 15 and discharge holes 16 are formed in housing 17, for guiding cool air from evaporator 12 to refrigeration compartment 3. Cool air path 15 is formed longitudinally along the rear side of housing 17 and discharge holes 16 are formed through housing 17 to communicate cool air path 15 with refrigeration compartment 3. A plurality of discharge holes 16 are arranged vertically in the center of housing 17, and cool air path 15 includes a first path 35 and a second path 36 formed in both sides of discharge holes 16. The plurality of discharge holes 16 are vertically arranged to correspond to respective sections (that is, spaces divided by shelves 8) like cool air guiding portions 26a of cool air discharge adjustment blade 26. In the embodiment, cool air guiding portions 26a of cool air discharge adjustment blade 26 are placed into discharge holes 16. Therefore, three discharge holes are provided. This constitution makes housing 17 relatively thin on the whole and, thus, the portion of housing 17 which protrudes into the refrigerator is shorter. As a result, the effective area of the refrigerator increases.

First path 35 and second path 36 are extended upward and downward so that their upper ends are placed on opposing sides of guide path 18 and their lower ends are connected to crisper 10. Therefore, cool air which has passed through guide path 18 by opening damper 19 flows down separately through first path 35 and second path 36 to refrigeration compartment 3 and crisper 10. A portion of the cool air is discharged through cool air discharge holes 23 into auxiliary compartment 9. Cool air path 15 for guiding cool air into refrigeration compartment 3 has first linking paths 37 for linking first path 35 to discharge holes 16 and second linking paths 38 for linking second path 36 with discharge holes 16. Thus, the cool air flowing along first path 35 and second path 36 are partially guided to first linking path 37 and second linking path 38 and discharged through discharge holes 16 into refrigeration compartment 3.

Here, first linking path 37 and second linking path 38 are formed so that their inlets connected to first and second paths 35 and 36 are wider than their outlets connected to discharge holes 16. Especially, each upper part of first and second linking paths 37 and 38 is rounded and each lower part is extended more outward than the rounded upper part by flanges 371, 372 and 373, thereby smoothly guiding the cool air flowing down to these linking paths.

In addition, as shown in FIG. 8, as first and second linking paths 37 and 38 are positioned downwards, the upper parts of the inlets of first and second linking paths 37 and 38 are preferably more rounded and their lower parts are extended more outward. Thus, the difference in temperatures of areas in refrigeration compartment 3, which depends on their heights, is reduced by discharging more cool air downward through linking paths 37 and 38 and discharge holes 16 into refrigeration compartment 3, since as cool air is discharged earlier, the temperature of the cool air is higher.

The amount of the cool air provided to crisper 10 is decreased while the amount of the cool air provided to refrigeration compartment 3 is increased, by preparing restriction protrusions 48 to a predetermined height in the lower ends of first and second paths 35 and 36, more specifically, in the lower parts of the inlets of first and second linking paths 37 and 38.

Meanwhile, discharge holes 16 are provided with first discharge portions 39 directly connected to first linking path 37 and second discharge portions 40 directly connected to second linking path 38 to make the cool air discharged into refrigeration compartment 3 flow separately, left and right. Preferably, first discharge portion 39 and second discharge portion 40 are stepped and communicate with each other. Also, the cool air guided to both discharge portions is discharged in mutually opposite directions and is smoothly distributed in refrigeration compartment 3, by forming first discharge portions 39 to be eccentric toward first linking path 37 and second discharge portions 40 to be eccentric toward first linking path 38. It is also desirable that first discharge portion 39 exchanges positions with second discharge portion 40 in adjacent discharge holes 16. That is, if upper discharge hole 16 has first discharge portion 39 in a higher place than second discharge portion 40, middle discharge hole 16 has second discharge portion 40 in a higher place than first discharge portion 39. Thus, since the temperature of cool air which is discharged first and falls downward is generally higher than that of the cool air which is discharged later, if the temperature of the cool air introduced from the right is lower than that from the left in the upper discharge hole, the cool air of lower temperature is introduced into the left side of the middle discharge hole, so that a temperature difference between the left and right sides of the refrigerator is eliminated, thereby achieving uniform refrigeration throughout the refrigeration compartment.

Referring to FIGS. 9A, 9B and 9C, cool air discharge adjustment blade 26 employed in the embodiment and its exemplary modifications will be described. Cool air discharge adjustment blade 26 is comprised of a plurality of cool air guiding portions 26a and supporting shaft 26b, as shown in FIGS. 9A, 9B and 9C. Cool air guiding portion 26a is provided with a distribution plate 44 having an upper plate 41, a lower plate 42, and a middle plate 43 which are disk-shaped and separated from one another by predetermined distances, and a dispersion guiding blade 47 including a first dispersion blade 45 for connecting upper and middle plates 41 and 43, and a second dispersion guiding blade 46 for connecting middle and lower plates 43 and 42. In the embodiment, cool air discharge adjustment blade 26 is comprised of three assembly bodies, each having distribution plate 44 and dispersion guiding blade 47 (the other one being false and described later) and supporting shaft 26b connected to the three assembly bodies, all of them being incorporated. That is, cool air discharge adjustment blade 26 is comprised of three cool air guiding portions 26a having distribution plates 44 and dispersion guiding blades 47 and supporting shaft 26b. The upper end of cool air discharge adjustment blade 26 is connected to the output shaft of driving motor 28. Therefore, cool air discharge adjustment blade 26 rotates by the rotative force of driving motor 28. Here, supporting shaft 26b preferably has a cross-shaped section to prevent warpage.

False cool air guiding portion 49 has nothing to do with cool air discharge, as in FIGS. 9A and 9B, since no discharge hole is formed where it is installed. However, false cool air guiding portion 49 is effective in distributing the cool air which has leaked through gaps between discharge holes and cool air discharge adjustment blade 26. Further, false cool air guiding portion 49 contributes to a balanced arrangement of cool air guiding portions, thus contributing to the overall appearance of the cool air guiding portions.

As shown in FIG. 9B, cool air discharge adjustment blade 26 is separably formed in order to overcome problems encountered in manufacturing molds. Cool air discharge adjustment blade 26 is comprised of an upper cool air discharge adjustment blade having an upper cool air guiding portion and a middle cool air guiding portion, and a lower cool air discharge adjustment blade including a false cool air guiding portion and a lower cool air guiding portion. That is, as described later, since incorporated molding is difficult to obtain when the dispersion guiding blade of each cool air guiding portion is disposed at a different angle, the cool air discharge adjustment blade is divided into two parts. Two cool air guiding portions having dispersion guiding blades disposed at a right angle are arranged in the upper cool air discharge adjustment blade and cool air guiding portions having dispersion guiding blades disposed at the same orientation are arranged in the lower cool air discharge adjustment blade. Thus, arrangement of the entire dispersion guiding blades can be controlled by controlling the combination angle at which the upper cool air discharge adjustment blade and the lower cool air discharge adjustment blade are combined. In the embodiment, the dispersion guiding blades of the lower cool air discharge blade are placed in the right center of both dispersion guiding blades of the upper cool air discharge blade. FIG. 9C is a view of an exemplary modification, showing cool air discharge adjustment blade 26 having no false cool air guiding portion.

On the other hand, as described above, each distribution plate is placed in each discharge hole 16 and the positions of distributing plate 44 and discharge hole 16 correspond to the positions of shelves 8 of refrigeration compartment 3. As shown in FIG. 10, middle plate 43 of distribution plate 44 is located at the boundary between first and second discharge portions 39 and 40 of discharge hole 16. Upper plate 41 is placed over middle plate 43 by the height of first discharge portion 39, and lower plate 42 is placed under middle plate 43 by the height of second discharge portion 40. Further, it is preferable that upper, middle and lower plates 41, 43 and 42 are of the same diameter which is approximately the width of discharge hole 16, to prevent leakage of the cool air. As a result, middle plate 43 and upper plate 41 or middle plate 43 and lower plate 42 form a curved path extended from the linking paths 37 and 38 in cooperation with dispersion guiding blade 47, so that the cool air is guided to be discharged into the refrigerator and the discharged cool air is uniformly distributed into the refrigerator. That is, upper, lower and middle plates 41, 42 and 43 of distribution plate 44 guide the cool air which has passed through linking paths 37 and 38 from cool air paths 35 and 36 to be discharged into the refrigerator, without directly flowing down. Thus, even if cool air discharge adjustment blade 26 rotates at a low speed, distribution plate 44 serves to collect the guided cool air and then discharge the cool air into the refrigerator.

As shown in FIG. 11, first and second dispersion guiding blades 45 and 46 are plane-symmetrical with each other and each of both dispersion guiding blades is rotation-symmetrical in itself. In detail, first and second dispersion guiding blades 45 and 46 have respective concave portions 50 and convex portions 51 which are smoothly connected in a "S" shape. Thus, the cool air flowing along dispersion guiding blade 47 through discharge holes 16 can smoothly circulate without any resistance. Also, first and second dispersion guiding blades 45 and 46 are plane-symmetrical with each other 43. Namely, the concave portion 50 and convex portion 51 of first dispersion guiding blade 45 and the concave portion 50 and convex portion 51 of second dispersion guiding blade 46 are arranged to be opposite to each other. Dispersion guiding blade 47 is constituted as above for the purpose of decreasing flow resistance in cooperation with first and second discharge portions 39 and 40 of discharge holes 16, both discharge portions being stepped with each other, as shown in FIG. 10. Thus, the cool air introduced into dispersion guiding blade 47 collides with rounded convex portion 51 and then flows along rounded surface of convex portion 51, thereby considerably decreasing the flow resistance. When first discharge portion 39 of discharge hole 16 is eccentric toward the right, convex portion 51 of first dispersion guiding blade 45 is located in the left. In this case, second discharge portion 40 is eccentric toward the left and convex portion 51 of second dispersion guiding blade 46 is located in the right. For example, as shown in FIGS. 10 and 11, the cool air introduced into first discharge portion 39 from the right flows along convex portion 51 of first dispersion guiding blade 45 and the cool air introduced into second discharge portion 40 from the left collides with convex portion 51 of second dispersion guiding blade 46, thereby flowing into a main air stream.

Also, as described above with reference to FIGS. 9A, 9B and 9C, a dispersion guiding blade 47b of the middle cool air guiding portion and a dispersion guiding blade 47c of the lower cool air guiding portion are arranged at 90° and 45° with respect to a dispersion guiding blade 47a of the upper cool air guiding portion. Since dispersion guiding blades 47a, 47b and 47c of the upper, middle and lower cool air guiding portions are arranged at different angles, cool air collides with dispersion guiding blades 47a, 47b and 47c in different positions and directions, thus distributing the load. For example, if all the dispersion guiding blades are placed at the same angle, the cool air collides sharply with the dispersion guiding blades, depending on the rotative position of cool air discharge adjustment blade 26. Thus, much load is applied to the cool air discharge adjustment blade 26. However, according to the embodiment of the present invention, since the dispersion guiding blades of the upper, middle and lower cool air guiding portions are arranged at different angles, cool air discharge adjustment blade 26 is not overloaded.

As described above, side portions (concave portion 50 or convex portion 51) of all dispersion guiding blades 47a, 47b and 47c are placed at an angle of 90° or below, regardless of the rotative position of cool air discharge adjusting blade 26. Thus, a left-concentrated refrigeration, a center-concentrated refrigeration and a right-concentrated refrigeration can be performed by controlling the rotative angle of cool air discharge adjusting blade 26. FIGS. 12A, 12B and 12C illustrate the left-, center- and right-concentrated refrigeration, respectively. Here, however, such concentrated refrigeration can be performed in any specified direction through the use of a control circuit.

To determine an area requiring concentrated refrigeration, as shown in FIG. 5, first temperature sensors 52a, 52b and 52c are installed on the right side wall of each section in refrigeration compartment 3 and second temperature sensors 53a, 53b and 53c are installed on the left side wall of each section in refrigeration compartment 3. These temperature sensors and the above-described position sensing switch 32 (see FIG. 6) are connected to a control portion 54, i.e., a microprocessor, as shown in FIG. 13. Driving motor 28 for driving cool air discharge adjustment blade 26 is also connected to control portion 54. The temperature sensors and position sensing switch 32 function to effectively perform the concentrated refrigeration by sensing temperature difference in refrigeration compartment 3.

The structures and operations of position sensing switch 32 for determining a reference position of cool air discharge adjustment blade 26 when performing concentrated refrigeration and an operating protrusion 33 for operating position sensing switch 32 are shown in FIGS. 14A, 14B and 14C. As shown in FIGS. 14A, 14B and 14C, operating protrusion 33 rotates simultaneously with cool air discharge adjustment blade 26 in the direction of the arrows. FIG. 14C shows a relationship between position sensing switch 32 and operating protrusion 33 when they lose contact. In the embodiment, the position of cool air discharge adjustment blade 26 in the position of the above contact-lost moment is set as a reference position thereof. Also, a portion of operating protrusion 33, which contacts position sensing switch 32 is streamlined to prevent noise produced in a sudden separation of position sensing switch 32 from operating protrusion 33.

The operation and controlling method of the refrigerator constituted as above, according to the present invention, will be described as follows.

First, when compressor 11 and evaporator 12 start to operate, evaporator 12 produces cool air through a thermal exchange with the ambient air. The thus-produced cool air is supplied to freezer compartment 2 and refrigeration compartment 3 by cooling fan 13, as directed by the arrows of FIG. 4. The opening and closing of damper 19 are controlled in accordance with the temperature of refrigeration compartment 3. When damper 19 is opened, the cool air is supplied to refrigeration compartment 3 via guide path 18. The cool air which has passed through guide path 18 is dispersed to the left and right via first and second paths 35 and 36 and then discharged into auxiliary compartment 9.

The discharge of the cool air into refrigeration compartment 3 will be described in detail, with reference to FIGS. 8, 9 and 10. The cool air flowing along first and second paths 35 and 36 is partially introduced into first and second linking paths 37 and 38 from the upper portion downward and then discharged through discharge holes 16. Here, the cool air is discharged, being distributed left and right by the rotation of cool air discharge adjustment blade 26. Without cool air discharging adjusting blade 26, the cool air can be distributed left and right since first and second discharge portions 39 and 40 of discharge hole 16 are stepped with each other and eccentric toward inlets where the cool air is introduced. However, the distribution of the cool air is accelerated by the rotation of cool air discharge adjustment blade 26, thus achieving uniform refrigeration for the refrigerator. In the embodiment, cool air discharge adjustment blade 26 rotates forward at a predetermined speed, that is, 6–10 rpm, by using a geared motor as a driving motor. This driving motor may be replaced with a stepping motor capable of varying the rotative speed.

In detail, as described above, discharge hole 16 is comprised of first and second discharge portions 39 and 40. First and second discharge portions 39 and 40 are communicated and stepped with each other. The cool air introduced into either discharge portion is discharged in the opposite direction of the other, thus smoothly distributing the cool air in refrigeration compartment 3. Also, first and second discharge portions 39 and 40 exchange positions with those of the adjacent discharge hole. Thus, if the cool air introduced from the right is lower in temperature than the cool air from the left in the upper discharge hole, the cool air introduced from the left is lower in temperature than the cool air from the right in the middle discharge hole. In the lower discharge hole, in turn, the cool air introduced from the right is lower in temperature than the cool air from the left. Then, uniform refrigeration can be realized across the refrigerator.

In addition, as shown in FIG. 8, since middle flanges 372 is extended more outward than upper flanges 371 and lower flanges 373 than middle flanges 372, more cool air is discharged into refrigeration compartment 3 through lower first and second linking paths 37 and 38, than upper first and second linking paths 37 and 38. Thus, even though cool air which is discharged earlier and falls down is generally higher in temperature, temperature difference depending on the height of the refrigeration compartment is eliminated, thereby achieving uniform refrigeration in the refrigeration compartment.

As described above, the refrigeration compartment can be uniformly refrigerated by discharging the cool air to be distributed and controlling the amount of the discharged cool air, without cool air discharge adjustment blade 26.

Further, the distribution of the cool air can be accelerated by the rotation of cool air discharge adjustment blade 26. Thus, uniform refrigeration is ensured in the refrigerator.

On the other hand, even if uniform refrigeration is achieved, when much foodstuff is stored or a warm item is put in a particular area, the uniform refrigeration of the refrigeration compartment is no longer maintained. Also, the rotation of cool air discharge blade 26 is not effective in realizing uniform refrigeration.

To solve this problem, concentrated refrigeration is needed for the particular area. The concentrated refrigeration according to the present invention will be described with reference to FIGS. 12A, 12B and 12C. First, when the left side of the refrigeration compartment requires concentrated refrigeration, cool air discharge adjustment blade 26 is fixed to be directed so that the cool air is mainly discharged into the left side, as shown in FIG. 12A. Here, dispersion guiding blades 47 of the upper, middle and lower cool air guiding portions are arranged toward the left side in an angle of 0° to 90°. When the center of the refrigeration compartment requires concentrated refrigeration, cool air discharge adjustment blade 26 is fixed to be directed so that the cool air is mainly discharged into the center of the refrigeration compartment, as shown in FIG. 12B. Here, dispersion guiding blades 47 of the three cool air guiding portions are arranged toward the center in an angle of 0° to 90°. When the right side of the refrigeration compartment requires concentrated refrigeration, cool air discharge adjustment blade 26 is fixed to be directed so that the cool air is mainly discharged into the right of the refrigeration compartment, as shown in FIG. 12C. Here, dispersion guiding blades 47 of the three cool air guiding portions are arranged toward the center in an angle range from 0° to 90°.

The control of the rotative angle of cool air discharge adjustment blade 26 is performed by position sensing switch 32 which is turned on and off by protrusion 33 of cool air discharge adjustment blade 26 and control portion 54. In this embodiment, from the point of time when operating protrusion 33 and position sensing switch 32 are separated, control portion 54 counts time and rotates cool air discharge adjustment blade 26 for a predetermined time to calculate the rotative angle thereof. For example, if the rotative speed of cool air discharge adjustment blade 26 is 6 rpm, a 10-second rotation from the reference point of time makes cool air discharge adjustment blade 26 rotate for one cycle.

By this control method, uniform refrigeration and intensive refrigeration which are characteristic of the present invention are performed. A method for controlling refrigerator temperature by controlling a cool air discharge direction will be described.

FIG. 16 is a flow-chart of the method for controlling refrigerator temperature by controlling a cool air discharge direction. As shown in the drawing, to reduce a temperature difference in a refrigeration compartment and keep the refrigeration compartment at a predetermined temperature, after differences in the temperatures of areas in the left and right sides of the refrigeration compartment are measured, cool air discharge control blade 26 for controlling a cool air discharge direction as shown in FIGS. 6 and 7A & 7B is rotated in a predetermined range of angle, as shown in FIG. 15, on the basis of the absolute value of the measured difference, or cool air is concentrated in a predetermined angle direction (in an area of high temperature), in the method for controlling refrigerator temperature by controlling a cool air discharge direction according to the present invention.

That is, at least two temperature sensors are attached to the left and right sides in the refrigeration compartment, facing each other, a difference in temperatures are calculated from temperature data of these temperature sensors, it is determined whether the absolute value of the difference is larger or smaller than a predetermined value, and then cool air is discharged within a predetermined range of angle or cool air is provided by rotating cool air discharge control blade 26 for controlling a cool air discharge direction in a predetermined range of angle.

To be more specific, as shown in FIG. 5, after three temperature sensors 52a, 52b and 52c are installed on the right side wall and three temperature sensors 53a, 53b and 53c are installed on the left side wall, respectively, temperature is measured in each sensor.

The absolute value $|S_L-S_R|$ of a difference between the average value $S_L$ or the representative value of the temperatures $S_{L1}$, $S_{L2}$ and $S_{L3}$ sensed in left temperature sensors 53a, 53b and 53c and the average value $S_R$ or the representative value of the temperatures $S_{R1}$, $S_{R2}$ and $S_{R3}$ sensed in right temperature sensors 52a, 52b and 52c is compared with a predetermined control reference temperature value.

That is, when cool air is discharged, if $|S_L-S_R|$ is larger than a control reference temperature value $\Delta T1$ for discharge of cool air, cool air is uniformly scattered by rotating cool air discharge control blade 26. If $|S_L-S_R|$ is smaller than $\Delta T1$, cool air discharge control blade 26 is kept in a predetermined direction of the left side or the right side or swings at random in a predetermined range of angle of the left side or the right side which is relatively high in temperature, to provide cool air intensively to an area which is at a high temperature.

On the other hand, when cool air is not discharged, if $|S_L-S_R|$ is larger than a control reference temperature $\Delta T2$ for non-discharge of cool air, cool air is uniformly scattered in the refrigeration compartment by swinging cool air discharge control blade 26, regardless of directions. If $|S_L-S_R|$ is smaller than $\Delta T2$, cool air discharge control blade 26 is kept in a predetermined direction of the left side or the right side, or swings at random in a predetermined range of angle of the left side or the right side which is relatively high in temperature, as shown in FIG. 15, to provide cool air intensively to an area which is at a high temperature.

The above method for controlling refrigerator temperature will be described in more detail.

When power is supplied to the refrigerator, in a case where a compressor is initially turned on, the current temperature in the refrigerator is considered as room temperature. Then, cool air is uniformly scattered by continuously rotating a cool air discharge direction control device, i.e., a cool air discharge control blade, to prevent increase of differences in the temperatures of areas of the refrigerator (the refrigeration compartment) during a rapid refrigeration. That is, if $|S_L-S_R|$ is larger than $\Delta T1$, cool air is uniformly scattered not to increase the temperature of a particular area.

When the compressor is on and the damper is opened, thus discharging cool air, cool air is discharged in one direction to be provided first to either of the left and right sides which is higher in temperature than the other. Here, since $|S_L-S_R|$ is smaller than $\Delta T1$ and the temperature of the whole refrigeration compartment is almost equal to a predetermined refrigeration temperature, cool air is provided intensively to either of the left and right sides which is higher in temperature than the other. If $S_L$ is larger than $S_R$, cool air is intensively provided by keeping cool air discharge control blade 26 in a predetermined angle direction (k1–k4) of the left side in accordance with the value of $S_L-S_R$, or temperature distribution in the refrigeration compartment is made as uniform as possible by rotating cool air discharge control blade 26 at random in an angle range of k1–k4, as shown in the upper part of FIG. 15. If $S_L$ is smaller than $S_R$, cool air is intensively provided by keeping cool air discharge control blade 26 in a predetermined angle direction (k5–k8) of the right side in accordance with the value of $S_L-S_R$, or temperature distribution in the refrigeration compartment is made as uniform as possible by rotating cool air discharge control blade 26 at random in an angle range of k5–k8, as shown in the lower part of FIG. 15. If $S_L$ is equal to $S_R$, cool air discharge control blade 26 is made to face the front and cool air is discharged separately to the left and right sides. An optimum $\Delta T1$ is 3° C., practically.

When the damper is closed or the compressor is off, thus not discharging cool air, if difference in temperatures of the left and right sides in the refrigeration compartment is large, cool air is oscillated to be uniformly scattered by rotating cool air discharge control blade 26 until the temperature difference is reduced. That is, when cool air is not discharged, if $|S_L-S_R|$ is larger than $\Delta T2$, cool air is oscillated to be uniformly scattered by rotating cool air discharge control blade 26. If $S_L$ is larger than $S_R$, cool air is oscillated to achieve a uniform temperature distribution in the left side by rotating cool air discharge control blade 26 at random in a predetermined angle direction (k1–k4) of the left side in accordance with the value of $S_L-S_R$, as shown in the upper part of FIG. 15. If $S_L$ is smaller than $S_R$, cool air is oscillated to achieve a uniform temperature distribution in the right side by rotating cool air discharge control blade 26 at random in a predetermined angle direction (k5–k8) of the right side in accordance with the value of $S_L-S_R$, as shown in the lower part of FIG. 15. If $S_L$ is equal to $S_R$, cool air discharge control blade 26 is made to face the front and cool air is oscillated in a predetermined range of angle, to thereby be distributed. An optimum $\Delta T2$ is 1° C., practically.

As described above, the refrigerator and the method for controlling refrigerator temperature by controlling a cool air discharge direction, according to the present invention, have the following advantages.

In the refrigerator of the present invention, (1) uniform refrigeration can be performed in any case since the cool air paths distribute cool air according to the arrangement and configuration of the discharge holes and the cool air discharge control blade distributes the discharged cool air; (2) decrease in the effective area of the refrigerator is prevented since the cool air paths are formed in both sides of the discharge holes, the cool air discharge control blade is placed in the discharge holes, and thus the housing is made slim; (3) an assembly work is facilitated by forming the housing as an assembly body of a motor, an indoor light, and the cool air discharge control blade which are combined; (4) molds are easy to fabricate and it is convenient to do after-services since the cooling discharge control blade is divided into two parts; (5) motor malfunction caused by introduction of moisture is prevented by disposing the motor above the cool air discharge control blade and installing the indoor light near the motor; and (6) even if the cool air discharge control blade rotates at a low speed, cool air is discharged into the refrigerator, without directly flowing down, by placing disk-shaped cool air guiding portions in the discharge holes.

In the method for controlling refrigerator temperature by controlling a cool air discharge direction, when cool air is discharged, if a difference in temperatures sensed by temperature sensors which are respectively installed on the left side wall and the right side wall of the refrigeration compartment, is larger than a control reference temperature of 3° C., the cool air is uniformly scattered by rotating the cool air discharge control blade. If the temperature difference is 3° C. or below, a uniform temperature distribution is achieved by consistently providing the cool air to either of the left and right sides which is at a relatively high temperature. When the cool air is not discharged, if the difference of temperatures in the sensors is larger than a control reference temperature 1° C., the cool air is oscillated by rotating cool air discharge control blade 26 to achieve a uniform temperature distribution in the left and right sides of the refrigeration compartment. If the temperature difference is 1° C. or below, cool air discharge control blade 26 is fixed. Thus, the method for controlling refrigerator temperature by controlling a cool air discharge direction is advantageous in that a rapid refrigeration and consistent and uniform temperature distribution are achieved at the same time.

What is claimed is:

1. A method for controlling refrigerator temperature by controlling a cool air discharge direction, comprising the steps of:

(a) determining whether a refrigerant circulating compressor is initially turned on, when power is applied;

(b) determining whether said compressor is normally turned on, when said compressor is not initially turned on;

(c) determining whether a damper is opened, when said compressor is normally turned on;

(d) determining whether a control reference temperature for discharge of cool air is larger than the absolute value of a difference between the average value of first temperatures sensed by first direction temperature sensing means and the average value of second temperatures sensed by second direction temperature sensing means, said first and second direction temperature sensing means being disposed to face each other a predetermined distance apart, when said damper is opened;

(e) determining whether a control reference temperature for non-discharge of cool air is smaller than said absolute value, when said compressor is not normally on;

(f) determining whether if said absolute value is smaller than said control reference temperature for discharge of cool air, when said damper is not opened;

(g) determining whether said first direction average value is larger than said second direction average value, when said absolute value is smaller than said control reference temperature for non-discharge of cool air;

(h) determining whether said first direction average value if larger than said second direction average value, when said absolute value is smaller than said control reference temperature for discharge of cool air;

(i) uniformly distributing cool air by rotating a cool air discharge control blade, if said compressor is initially on;

(j) dispersedly providing said cool air by rotating said cool air discharge control blade, when said absolute value is not smaller than said reference temperature for discharge of cool air;

(k) dispersedly providing said cool air by rotating said cool air discharge control blade, when said absolute value is not smaller than said control reference temperature for non-discharge of cool air;

(l) providing said cool air in a first direction by keeping said cool air discharge control blade at an angle of said first direction, if said first direction average value is larger than said second direction average value;

(m) determining whether said first direction average value is smaller than said second direction average value;

(n) providing said cool air in a second direction by keeping said cool air discharge control blade at an angle of said second direction, if said first direction average value is smaller than said second direction average value; and (o) providing said cool air to the front by directing said cool air discharge control blade to the front, if said first direction average value is equal to said second direction average value.

2. A method for controlling refrigerator temperature by controlling a cool air discharge direction as claimed in claim 1, wherein said average values are replaced with representative values of said first and second temperatures.

3. A method for controlling refrigerator temperature by controlling a cool air discharge direction as claimed in claim 1, wherein said control reference temperature for discharge of cool air is always larger than said control reference temperature for non-discharge of cool air.

4. A method for controlling refrigerator temperature by controlling a cool air discharge direction as claimed in claim 2, wherein said control reference temperature for discharge of cool air is always larger than said control reference temperature for non-discharge of cool air.

5. A method for controlling refrigerator temperature by controlling a cool air discharge direction as claimed in claim 3, wherein said control reference temperature for discharge of cool air is 3° C.

6. A method for controlling refrigerator temperature by controlling a cool air discharge direction as claimed in claim 4, wherein said control reference temperature for discharge of cool air is 3° C.

7. A method for controlling refrigerator temperature by controlling a cool air discharge direction as claimed in claim 3, wherein said control reference temperature for non-discharge of cool air is 1° C.

8. A method for controlling refrigerator temperature by controlling a cool air discharge direction as claimed in claim 4, wherein said control reference temperature for non-discharge of cool air is 1° C.

9. A method for controlling refrigerator temperature by controlling a cool air discharge direction as claimed in claim 1, wherein in said step (1), said cool air discharge control blade is fixed to discharge said cool air at a predetermined angle of said first direction or swings at random in said first direction, in accordance with the remainder obtained by subtracting said second direction average value or representative value from said first direction average value or representative value.

10. A method for controlling refrigerator temperature by controlling a cool air discharge direction as claimed in claim 2, wherein in said step (1), said cool air discharge control blade is fixed to discharge said cool air at a predetermined angle of said first direction or swings at random in said first direction, in accordance with the remainder obtained by subtracting said second direction average value or representative value from said first direction average value or representative value.

11. A method for controlling refrigerator temperature by controlling a cool air discharge direction as claimed in claim 1, wherein in said step (n), said cool air discharge control blade is fixed to discharge said cool air at a predetermined angle of said second direction or swings at random in said second direction, in accordance with the remainder obtained by subtracting said first direction average value or representative value from said second direction average value or representative value.

12. A method for controlling refrigerator temperature by controlling a cool air discharge direction as claimed in claim 2, wherein in said step (n), said cool air discharge control blade is fixed to discharge said cool air at a predetermined angle of said second direction or swings at random in said second direction, in accordance with the remainder obtained by subtracting said first direction average value or representative value from said second direction average value or representative value.

13. In a refrigerator having a body which is equipped with a freezer compartment and a refrigeration compartment, an evaporator for producing cool air and providing said cool air to said freezer and refrigeration compartments, a housing installed in a predetermined portion of said refrigeration compartment and having a guide path for guiding said cool air from said evaporator to said refrigeration compartment, cool air paths formed at both sides of said housing to be communicated with said guide path and having a first path and a second path to guide said cool air from said guide path, a plurality of discharge holes vertically arranged between said first path and said second path, for guiding said cool air to be discharged into said refrigeration compartment through said cool air paths, a cool air discharge adjustment blade ratably installed in the front surface, for distributing left and right or collecting said cool air from said discharge holes, a driving motor for rotating said cool air discharge adjustment blade, first temperature sensors installed in the center of one side wall of each part in said refrigeration compartment, second temperature sensors installed in the center of the other side wall thereof, a position sensing switch for turning on/off in accordance with the rotative position of said cool air discharge adjustment blade, and a control portion electrically connected to said first temperature sensor, said second temperature sensor and said position sensing switch, for determining the rotative position of said cool air discharge adjustment blade; and wherein said cool air path is further provided with first linking paths for linking respective discharge holes to said first path and second linking paths for linking respective discharge holes to said second path, each discharge hole is provided with a first discharge portion directly linked to said first linking path and a second discharge portion directly linked to said second linking path, said first discharge portion is communicated with said second discharge portion, and said first and second discharge portions are formed to be mutually stepped and eccentric toward said first linking path and said second linking path, respectively, and said cool air discharge adjustment blade is provided with a distribution plate having a middle plate placed at the boundary surface between said first discharge portion and said second discharge portion, and an upper plate and a lower plate which are placed over and under said middle plate by the height of said middle plate, respectively, and a dispersion guiding blade having a first dispersion guiding blade for vertically connecting said upper plate and said middle plate, and a second dispersion guiding blade for vertically connecting said middle plate and said lower plate; a refrigerator temperature controlling method in said control portion comprising the steps of:

determining whether a refrigerant circulating compressor is initially turned on, when power is applied;

determining whether a door of a refrigerator is open, when said compressor is not initially on;

firstly discharging cool air to be distributed by rotating a discharge damper with damper control means for controlling the amount of the cool air discharged into a refrigerator, when said compressor is initially on; secondly discharging cool air to be distributed by rotating said discharge damper with said damper control means for controlling the amount of the cool air discharged into said refrigerator, when said door is open;

determining whether the average value of temperatures sensed by first temperature sensing means provided at a first position of said refrigerator is larger than the average value of temperatures sensed by second temperature sensing means provided at a second position of said refrigerator to face the first temperature sensing means, when said door is not open;

discharging the cool air toward said first temperature sensing means under control of said cool air discharge direction controlling means, if the average value of temperatures sensed by said first temperature sensing means is larger than the average value of temperatures sensed by said second temperature sensing means;

determining whether the average value of temperatures sensed by said first temperature sensing means is smaller than the average value of temperatures sensed by said second temperature sensing means, if the average value of temperatures sensed by said first temperature sensing means is not larger than the average value of temperatures sensed by said second temperature sensing means;

discharging the cool air toward said second temperature sensing means under control of said cool air discharge direction controlling means, if the average value of temperatures sensed by said first temperature sensing means is smaller than the average value of temperatures sensed by said second temperature sensing means; and discharging the cool air toward the front under control of said cool air discharge direction controlling means, if the average value of temperatures sensed by said first temperature sensing means is equal to the average value of temperatures sensed by said second temperature sensing means.

14. A method for controlling refrigerator temperature by controlling a cool air discharge direction as claimed in claim 13, wherein said average value can be replaced with a representative value.

15. A method for controlling refrigerator temperature by controlling a cool air discharge direction as claimed in claim 13, wherein said steps of comparing the average value of temperatures sensed by said first temperature sensing means with the average value of temperatures sensed by said second temperature sensing means further comprise the step of calculating the average values of the temperatures sensed by said first and second temperature sensing means, respectively.

16. A method for controlling refrigerator temperature by controlling a cool air discharge direction as claimed in claim 14, wherein said steps of comparing the representative value of temperatures sensed by said first temperature sensing means with the representative value of temperatures sensed by said second temperature sensing means further comprise the step of comparing the temperatures sensed by the first temperature sensing means with one another and comparing the temperatures sensed by the second temperature sensing means with one another, in order to obtain respective representative values of the temperatures sensed by said first and second temperature sensing means.

17. A method for controlling refrigerator temperature by controlling a cool air discharge direction as claimed in claim 16, wherein in said step of comparing said representative values, the maximum values of the temperatures sensed by said first and second temperature sensing means are compared.

18. A method for controlling refrigerator temperature by controlling a cool air discharge direction as claimed in claim 15, wherein in said step of comparing said representative values, the medium values of the temperatures sensed by said first and second temperature sensing means are compared.

19. In a refrigerator having a body having a freezer compartment and a refrigeration compartment, an evaporator for producing cool air and providing said cool air to said freezer and refrigeration compartments, a housing installed in a predetermined portion of said refrigeration compartment and having a guide path for guiding said cool air from said evaporator to said refrigeration compartment, cool air paths formed at both sides of said housing to be communicated with said guide path and having a first path and a second path to guide said cool air from said guide path, a plurality of discharge holes vertically arranged between said first path and said second path, for guiding said cool air to be discharged into said refrigeration compartment through said cool air paths, a cool air discharge adjustment blade rotatably installed in the front surface, for distributing left and right or collection said cool air from said discharge holes, a driving motor for rotating said cool air discharge adjustment blade, first temperature sensors installed in the center of one side wall of each part in said refrigeration compartment, second temperature sensors installed in the center of the other side wall thereof, a position sensing switch for turning on/off in accordance with the rotative position of said cool air discharge adjustment blade, and a control portion electrically connected to said first temperature sensor, said second temperature sensor and said position sensing switch, for determining the rotative position of said cool air discharge adjustment blade; and where in said cool air discharge adjustment blade is provided with a distribution plate having a middle plate placed at the boundary surface between said first discharge portion and said second discharge portion, and an upper plate and a lower plate which are placed over and under said middle plate by the height of said middle plate, respectively, and a dispersion guiding blade having a first dispersion guiding blade for vertically connecting duet upper plate and said middle plate, and a second dispersion guiding blade for vertically connecting said middle plate and said lower plate; a refrigerator temperature controlling method in said control portion comprising the steps of:

determining whether a refrigerant circulating compressor is initially on, when power is applied;

determining whether said compressor is on in a normal operation, when said compressor is not initially on;

determining whether a damper for controlling the amount of cool air discharged into a refrigerator is open, when said compressor is on in the normal operation;

determining whether a control reference temperature for discharge of cool air is larger than the absolute value of a difference in temperatures sensed by two temperature sensing means which are selected from at least two temperature sensing means arranged to face each other a predetermined distance apart, when said damper is open;

determining whether a control reference temperature for non-discharge of cool air is larger than the absolute value of a difference in temperatures sensed by said two temperature sensing means, when said compressor is not on in the normal operation;

determining whether the control reference temperature for non-discharge of cool air is larger than the absolute value of a difference in temperatures sensed by said two temperature sensing means, when said damper is open;

firstly discharging the cool air in a predetermined direction, when said control reference temperature for discharge of cool air is larger than the absolute value of a difference in temperatures sensed by said two temperature sensing means;

secondly discharging the cool air in the predetermined direction, when said control reference temperature for non-discharge of cool air is larger than the absolute value of a difference in temperatures sensed by said two temperature sensing means;

firstly rotating a cool air discharge control blade, when said compressor is on secondly rotating a cool air discharge control blade, when said control reference temperature for discharge of cool air is not larger than the absolute value of a difference in temperatures sensed by said two temperatures sensing means; and thirdly rotating a cool air discharge control blade, when said control reference temperature for non-discharge of cool air is not larger than the absolute value of a difference in temperatures sensed by said two temperature sensing means.

20. A method for controlling refrigerator temperature by controlling a cool air discharge direction as claimed in claim 19, wherein said control reference temperature for discharge of cool air is always larger than said control reference temperature for non-discharge of cool air.

21. A method for controlling refrigerator temperature by controlling a cool air discharge direction as claimed in claim 18, wherein said control reference temperature for discharge of cool air is 3%C.

22. A method for controlling refrigerator temperature by controlling a cool air discharge direction as claimed in claim 18, wherein said control reference temperature for non-discharge of cool air is 1%C.

* * * * *